(12) United States Patent
Kim et al.

(10) Patent No.: US 11,301,103 B2
(45) Date of Patent: Apr. 12, 2022

(54) TOUCH INPUT DEVICE

(71) Applicant: HiDeep Inc., Gyeonggi-do (KR)

(72) Inventors: Seyeob Kim, Gyeonggi-do (KR);
Sangsic Yoon, Gyeonggi-do (KR);
Sunyoung Kwon, Gyeonggi-do (KR);
Hojun Moon, Gyeonggi-do (KR);
Taehoon Kim, Gyeonggi-do (KR);
Bonkee Kim, Gyeonggi-do (KR)

(73) Assignee: HiDeep Inc.

( * ) Notice: Subject to any disclaimer, the term of this patent is extended or adjusted under 35 U.S.C. 154(b) by 0 days.

(21) Appl. No.: 17/209,163

(22) Filed: Mar. 22, 2021

(65) Prior Publication Data

US 2021/0278931 A1    Sep. 9, 2021

Related U.S. Application Data

(63) Continuation of application No. 16/660,754, filed on Oct. 22, 2019, now Pat. No. 10,983,648, which is a
(Continued)

(30) Foreign Application Priority Data

Aug. 1, 2014  (KR) .................. KR1020140098917
Sep. 19, 2014 (KR) .................. KR1020140124920
(Continued)

(51) Int. Cl.
G06F 3/044      (2006.01)
G06F 3/041      (2006.01)

(52) U.S. Cl.
CPC .......... *G06F 3/0446* (2019.05); *G06F 3/0443* (2019.05); *G06F 3/0445* (2019.05);
(Continued)

(58) Field of Classification Search
USPC ....................................................... 345/173
See application file for complete search history.

(56) References Cited

U.S. PATENT DOCUMENTS 5,510,813 A * 4/1996 Makinwa ............... G06F 3/041
                                              345/173
6,002,389 A   12/1999 Kasser
(Continued)

FOREIGN PATENT DOCUMENTS

CN    102279687    12/2011
CN    103221911     7/2013
(Continued)

OTHER PUBLICATIONS

Chokri Cherif et al., "Textile Werkstoffe fur den Leichtbau," Jan. 1, 2011.
(Continued)

*Primary Examiner* — Chineyere D Wills-Burns
(74) *Attorney, Agent, or Firm* — The Belles Group, P.C.

(57) ABSTRACT

A touch input device includes an organic light emitting display module; a pressure sensor including a pressure electrode outputting a first sensing signal for detecting a touch pressure and which is attached under the organic light emitting display module; a touch sensor including drive electrodes to which a driving signal is applied and receiving electrodes outputting a second sensing signal for detecting a touch position; and a substrate located under the organic light emitting display module. The substrate is spaced apart from the organic light emitting display module and includes a reference potential layer. A controller detects a magnitude of the touch pressure based on the first sensing signal. The organic light emitting display module is bent by the touch pressure. A distance between the pressure electrode and the
(Continued)

reference potential layer is changed according to a bending of the organic light emitting display module.

22 Claims, 24 Drawing Sheets

Related U.S. Application Data continuation of application No. 14/614,086, filed on Feb. 4, 2015, now Pat. No. 10,474,271.

(30) Foreign Application Priority Data

Oct. 24, 2014 (KR) .................. KR1020140145022
Dec. 22, 2014 (KR) .................. KR1020140186352

(52) U.S. Cl.
CPC ........ *G06F 3/0447* (2019.05); *G06F 3/04166* (2019.05); *G06F 2203/04105* (2013.01)

(56) References Cited

U.S. PATENT DOCUMENTS

| | | | |
|---|---|---|---|
| 8,089,470 B1 | 1/2012 | Schediwy | |
| 9,201,105 B2 | 12/2015 | Iida et al. | |
| 9,542,031 B2 | 1/2017 | Shibata et al. | |
| 2003/0007238 A1 | 1/2003 | Liang et al. | |
| 2004/0227736 A1 | 11/2004 | Kamrath et al. | |
| 2005/0253821 A1 | 11/2005 | Roeder | |
| 2006/0033721 A1 | 2/2006 | Woolley | |
| 2006/0138574 A1 | 6/2006 | Saito et al. | |
| 2006/0146033 A1 | 7/2006 | Chen et al. | |
| 2007/0030255 A1 | 2/2007 | Pak et al. | |
| 2007/0085837 A1* | 4/2007 | Ricks ...................... G06F 3/045 345/173 |
| 2007/0159561 A1* | 7/2007 | Chien ................... G06F 3/0446 349/12 |
| 2007/0291014 A1 | 12/2007 | Layton | |
| 2008/0062139 A1 | 3/2008 | Hotelling et al. | |
| 2008/0062140 A1 | 3/2008 | Hotelling et al. | |
| 2008/0202251 A1 | 8/2008 | Serban et al. | |
| 2009/0046068 A1 | 2/2009 | Griffin | |
| 2009/0086113 A1* | 4/2009 | Ko ........................ G06F 3/0443 349/12 |
| 2009/0135161 A1 | 5/2009 | Endo | |
| 2009/0160822 A1 | 6/2009 | Eguchi et al. | |
| 2009/0316380 A1* | 12/2009 | Armstrong .......... G06F 3/04142 361/829 |
| 2010/0024573 A1* | 2/2010 | Daverman ............... G01L 1/142 73/862.626 |
| 2010/0033354 A1 | 2/2010 | Ejlersen | |
| 2010/0107770 A1 | 5/2010 | Serban et al. | |
| 2010/0123672 A1 | 5/2010 | Kim et al. | |
| 2010/0149129 A1 | 6/2010 | Hommer et al. | |
| 2010/0253643 A1 | 10/2010 | McKay | |
| 2010/0253645 A1 | 10/2010 | Bolender | |
| 2010/0309030 A1 | 12/2010 | Huang et al. | |
| 2010/0321609 A1 | 12/2010 | Qi et al. | |
| 2011/0012869 A1 | 1/2011 | Klinghult | |
| 2011/0023631 A1 | 2/2011 | Sleeman | |
| 2011/0023634 A1 | 2/2011 | Carkner | |
| 2011/0037726 A1* | 2/2011 | Lee ..................... G06F 3/04142 345/174 |
| 2011/0057880 A1 | 3/2011 | Kasahara | |
| 2011/0057899 A1 | 3/2011 | Sleeman et al. | |
| 2011/0080373 A1 | 4/2011 | Wang et al. | |
| 2011/0084985 A1 | 4/2011 | Kojima | |
| 2011/0096025 A1 | 4/2011 | Slobodin et al. | |
| 2011/0115738 A1 | 5/2011 | Suzuki et al. | |
| 2011/0126900 A1* | 6/2011 | Inoue ................... H01G 9/2095 136/256 |
| 2011/0157087 A1 | 6/2011 | Kanehira et al. | |
| 2011/0175845 A1 | 7/2011 | Honda et al. | |
| 2011/0267284 A1 | 11/2011 | Lee et al. | |
| 2011/0298479 A1 | 12/2011 | Matsushina | |
| 2011/0310053 A1 | 12/2011 | Kim et al. | |
| 2012/0038583 A1 | 2/2012 | Westhues et al. | |
| 2012/0044266 A1 | 2/2012 | Mori | |
| 2012/0050195 A1* | 3/2012 | Heo ....................... G06F 3/041 345/173 |
| 2012/0068965 A1 | 3/2012 | Wada et al. | |
| 2012/0074961 A1 | 3/2012 | Herrmann | |
| 2012/0105340 A1* | 5/2012 | Beom ................... G06F 3/0412 345/173 |
| 2012/0113361 A1 | 5/2012 | Huang et al. | |
| 2012/0127095 A1* | 5/2012 | Jun ...................... G06F 3/0446 345/173 |
| 2012/0144981 A1 | 6/2012 | Ciccone | |
| 2012/0147052 A1 | 6/2012 | Homma | |
| 2012/0180575 A1 | 7/2012 | Sakano et al. | |
| 2012/0182261 A1 | 7/2012 | Wang et al. | |
| 2012/0206664 A1 | 8/2012 | Brown | |
| 2012/0242635 A1 | 9/2012 | Erhart et al. | |
| 2012/0319966 A1 | 12/2012 | Reynolds | |
| 2013/0009653 A1 | 1/2013 | Fukushima | |
| 2013/0016059 A1 | 1/2013 | Lowles et al. | |
| 2013/0016060 A1 | 1/2013 | Pereverzev et al. | |
| 2013/0018059 A1 | 1/2013 | Jacob et al. | |
| 2013/0033450 A1 | 2/2013 | Coulson et al. | |
| 2013/0106780 A1* | 5/2013 | Hotelling .............. G06F 3/0412 345/174 |
| 2013/0208291 A1 | 8/2013 | Ikeda | |
| 2013/0234734 A1* | 9/2013 | Iida ........................ G06F 3/0447 324/661 |
| 2013/0234977 A1 | 9/2013 | Lin | |
| 2013/0241873 A1 | 9/2013 | Kim et al. | |
| 2013/0249859 A1 | 9/2013 | Park et al. | |
| 2013/0257784 A1 | 10/2013 | Vandermeijden et al. | |
| 2014/0002113 A1 | 1/2014 | Schediwy et al. | |
| 2014/0028616 A1 | 1/2014 | Furutani et al. | |
| 2014/0049506 A1 | 2/2014 | Lin | |
| 2014/0062934 A1 | 3/2014 | Coulson et al. | |
| 2014/0078080 A1 | 3/2014 | Kim et al. | |
| 2014/0111953 A1* | 4/2014 | McClure ................ H05K 1/147 361/749 |
| 2014/0204049 A1 | 7/2014 | Tsai et al. | |
| 2014/0204285 A1 | 7/2014 | Jang | |
| 2014/0210791 A1 | 7/2014 | Hanauer et al. | |
| 2014/0267128 A1 | 9/2014 | Bulea et al. | |
| 2014/0267134 A1 | 9/2014 | Bulea et al. | |
| 2014/0307186 A1 | 10/2014 | Yun et al. | |
| 2015/0009432 A1 | 1/2015 | Katagiri | |
| 2015/0076531 A1 | 3/2015 | Kim | |
| 2015/0097802 A1 | 4/2015 | Kim et al. | |
| 2015/0168767 A1 | 6/2015 | Yonemura | |
| 2015/0169121 A1 | 6/2015 | Yao et al. | |
| 2015/0212633 A1* | 7/2015 | Yamagishi ............ G06F 3/0447 345/174 |
| 2015/0235607 A1 | 8/2015 | Nakanishi et al. | |
| 2015/0268783 A1* | 9/2015 | Yoon .................... G06F 3/0445 345/173 |
| 2015/0277626 A1* | 10/2015 | Shinkai ................ G06F 3/0446 345/174 |
| 2015/0301660 A1 | 10/2015 | Watazu | |
| 2015/0355771 A1 | 12/2015 | Watazu et al. | |
| 2015/0370373 A1 | 12/2015 | Barel | |
| 2016/0034087 A1 | 2/2016 | Kim et al. | |
| 2016/0035290 A1 | 2/2016 | Kim et al. | |
| 2016/0062500 A1 | 3/2016 | Kessler et al. | |
| 2016/0085336 A1 | 3/2016 | Kim et al. | |
| 2016/0088133 A1 | 3/2016 | Kim et al. | |
| 2016/0188082 A1 | 6/2016 | Ham et al. | |
| 2016/0209984 A1 | 7/2016 | Richards | |

FOREIGN PATENT DOCUMENTS

| | | |
|---|---|---|
| CN | 103257779 | 8/2013 |
| CN | 203386194 | 1/2014 |
| JP | 2007048275 | 2/2007 |
| JP | 2007322587 | 12/2007 |
| JP | 2009163363 | 7/2009 |

(56) References Cited

FOREIGN PATENT DOCUMENTS

| | | |
|---|---|---|
| JP | 2010033382 | 2/2010 |
| JP | 2010108501 | 5/2010 |
| JP | 2010140417 | 6/2010 |
| JP | 2010244514 | 10/2010 |
| JP | 2011-053831 | 3/2011 |
| JP | 2011081578 | 4/2011 |
| JP | 2011086191 | 4/2011 |
| JP | 2011100364 | 5/2011 |
| JP | 2011-165023 | 8/2011 |
| JP | 2011248439 | 12/2011 |
| JP | 2011258043 | 12/2011 |
| JP | 2012-048279 | 3/2012 |
| JP | 2012084025 | 4/2012 |
| JP | 2012235224 | 11/2012 |
| JP | 2013015976 | 1/2013 |
| JP | 2013-045173 | 3/2013 |
| JP | 2013088932 | 5/2013 |
| JP | 2013105154 | 5/2013 |
| JP | 2013132736 | 7/2013 |
| JP | 2013-171369 | 9/2013 |
| JP | 2013-546050 | 12/2013 |
| JP | 2013242770 | 12/2013 |
| JP | 2014-112436 | 6/2014 |
| JP | 2014-115708 | 6/2014 |
| JP | 5567727 | 8/2014 |
| JP | 2014194591 | 10/2014 |
| JP | 5798700 | 10/2015 |
| KR | 1020090068165 | 6/2009 |
| KR | 200900776126 | 7/2009 |
| KR | 1020090076126 | 7/2009 |
| KR | 20100025176 | 3/2010 |
| KR | 1020110022727 | 3/2011 |
| KR | 20110039304 | 4/2011 |
| KR | 1033154 | 5/2011 |
| KR | 1020110128724 | 11/2011 |
| KR | 20120053716 | 5/2012 |
| KR | 20120139518 | 12/2012 |
| KR | 101311235 | 9/2013 |
| KR | 1020130127176 | 11/2013 |
| KR | 20130131647 | 12/2013 |
| KR | 20140080596 | 7/2014 |
| KR | 1020140096905 | 8/2014 |
| KR | 20150011271 | 1/2015 |
| KR | 101506511 | 4/2015 |
| TW | 201347006 | 11/2013 |
| WO | WO2010/115131 | 10/2010 |
| WO | WO2011013588 | 2/2011 |
| WO | WO2011111906 | 9/2011 |
| WO | WO 2013/028538 | 2/2013 |
| WO | WO2013/132736 | 9/2013 |
| WO | WO2013140975 | 9/2013 |
| WO | WO2014017248 | 1/2014 |
| WO | WO2014080924 | 5/2014 |
| WO | WO2013129092 | 7/2015 |
| WO | WO2015106183 | 7/2015 |
| WO | WO2014141584 | 2/2017 |

OTHER PUBLICATIONS

Goel et al, "GripSense: Using Built-In Sensors to Detect Hand Posture and Pressure on Commodity Mobile Phones," pp. 545-554, Oct. 2012.
Geoff Walker, "Part I: Fundamentals of Projected-Capacitive Touch Technology," Jun. 1, 2014.
Corresponding Communication pursuant to Article 94(3) issued by the EPO dated Aug. 30, 2017.
Corresponding Office Action Issued by JPO dated Aug. 25, 2015.
Corresponding Office Action Issued by the JPO dated Jul. 14, 2015.
Corresponding Office Action Issued by the JPO dated Jul. 28, 2015.
Corresponding Office Action issued by the KIPO dated Jul. 31, 2017.
Corresponding Office Action Issued by the KIPO dated Oct. 19, 2015.
Corresponding Office Action Issued by the KIPO dated Sep. 23, 2015.
Corresponding Office Action Issued by the KIPO dated Sep. 30, 2015.
Corresponding Office Action Issued by the SIPO dated Oct. 23, 2017.
Corresponding Search Report Issued by the EPO dated Aug. 27, 2015.
Corresponding U.S. Appl. No. 14/820,942, filed Aug. 7, 2015.
Corresponding U.S. Appl. No. 14/908,706, filed Jan. 29, 2016.
Corresponding U.S. Appl. No. 14/992,568, filed Jan. 11, 2016.
Corresponding U.S. Appl. No. 15/007,240, filed Jan. 27, 2016.
Corresponding U.S. Appl. No. 15/007,245, filed Jan. 27, 2016.
Corresponding U.S. Appl. No. 15/009,951, filed Jan. 29, 2016.
Corresponding U.S. Appl. No. 15/009,973, filed Jan. 29, 2016.
Corresponding U.S. Appl. No. 15/071,561, filed Mar. 16, 2016.
Corresponding U.S. Appl. No. 14/992,668, filed Jan. 11, 2016.
International Search Report for Corresponding Application No. PCT/KR2014/006907, dated Nov. 28, 2014.
Japanese Office Action dated Oct. 23, 2018 to related application No. 2017-226677.
Related Japanese Office Action dated Mar. 5, 2019.
Related U.S. Office Action dated Jan. 8, 2019.

\* cited by examiner

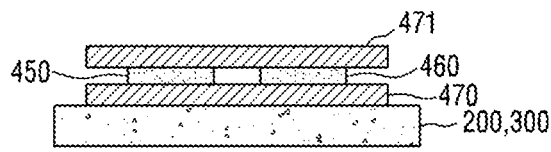
FIG. 9A
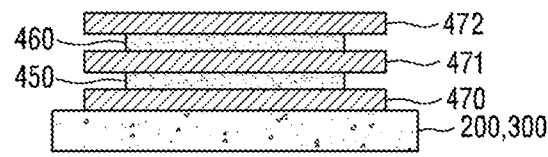
FIG. 9B
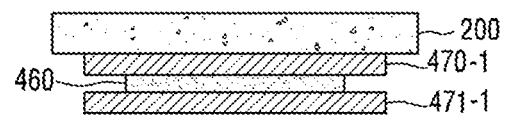
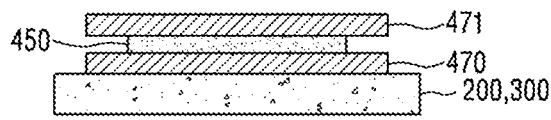
FIG. 9C
FIG. 9D
Fig. 10a
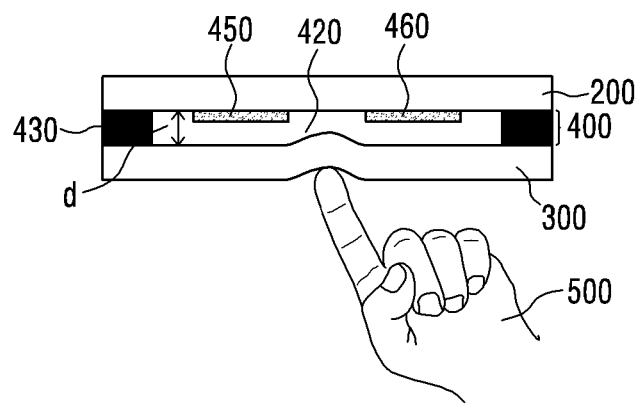

TOUCH INPUT DEVICE

CROSS REFERENCE TO RELATED APPLICATIONS

The present application is a continuation of U.S. patent application Ser. No. 16/660,754, filed on Oct. 22, 2019, which is a continuation of U.S. patent application Ser. No. 14/614,086, filed on Feb. 4, 2015, which claims priority to Korean Patent Application No.: 10-2014-0098917, filed Aug. 1, 2014; Korean Patent Application No.: 10-2014-0124920, filed Sep. 19, 2014; Korean Patent Application No.: 10-2014-0145022, filed Oct. 24, 2014; and Korean Patent Application No.: 10-2014-0186352, filed Dec. 22, 2014. The disclosures of the aforementioned priority applications are incorporated herein by reference in their entireties.

FIELD OF THE INVENTION

The present invention relates to a touch input device, and more particularly to a touch input device which includes a display module and is configured to detect a touch position and the magnitude of a touch pressure.

BACKGROUND OF THE INVENTION

Various kinds of input devices are being used to operate a computing system. For example, the input device includes a button, key, joystick and touch screen. Since the touch screen is easy and simple to operate, the touch screen is increasingly being used in operation of the computing system.

The touch screen may constitute a touch surface of a touch input device including a touch sensor panel which may be a transparent panel including a touch-sensitive surface. The touch sensor panel is attached to the front side of a display screen, and then the touch-sensitive surface may cover the visible side of the display screen. The touch screen allows a user to operate the computing system by simply touching the touch screen by a finger, etc. Generally, the computing system recognizes the touch and the touch position on the touch screen and analyzes the touch, and thus, performs the operations in accordance with the analysis.

Here, there is a demand for a touch input device capable of detecting not only the touch position according to the touch on the touch screen but the magnitude of the touch pressure without degrading the performance of the display module.

SUMMARY OF THE INVENTION

A touch input device includes an organic light emitting display module; a pressure sensor including a pressure electrode outputting a first sensing signal for detecting a touch pressure and which is attached under the organic light emitting display module; a touch sensor including a plurality of drive electrodes to which a driving signal is applied and a plurality of receiving electrodes outputting a second sensing signal for detecting a touch position; and a substrate located under the organic light emitting display module. The substrate is spaced apart from the organic light emitting display module and includes a reference potential layer. A controller detects a magnitude of the touch pressure based on the first sensing signal. The organic light emitting display module is bent by the touch pressure. A distance between the pressure electrode and the reference potential layer is change according to a bending of the organic light emitting display module. The first sensing signal includes an electrical characteristics information changed according to the distance.

BRIEF DESCRIPTION OF THE DRAWINGS

FIGS. 9a to 9d show an attachment structure of the pressure electrode according the embodiment of the present invention;

FIGS. 10a and 10b show a touch input device according to a fifth embodiment of the present invention;

DETAILED DESCRIPTION OF THE INVENTION

Figure 1:
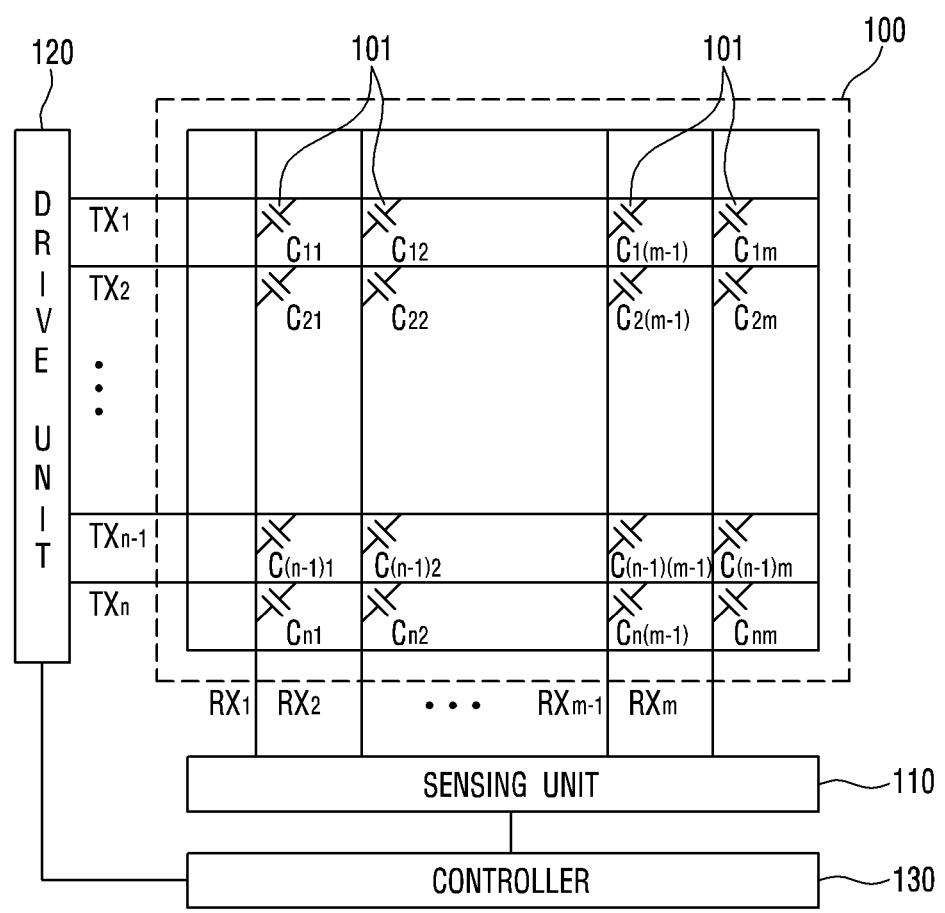
FIG. 1 is a schematic view of a configuration of a capacitance type touch sensor panel and the operation thereof in accordance with an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. Similar reference numerals in the drawings designate the same or similar functions in many aspects.

A touch input device according to an embodiment of the present invention will be described with reference to the accompanying drawings. While a capacitance type touch sensor panel 100 and a pressure detection module 400 are described below, the touch sensor panel 100 and the pressure detection module 400 may be adopted, which are capable of detecting a touch position and/or touch pressure by any method.

FIG. 1 is a schematic view of a configuration of the capacitance touch sensor panel 100 and the operation thereof in accordance with the embodiment of the present invention. Referring to FIG. 1, the touch sensor panel 100 according to the embodiment of the present invention may include a plurality of drive electrodes TX1 to TXn and a plurality of receiving electrodes RX1 to RXm, and may include a drive unit 120 which applies a driving signal to the plurality of drive electrodes TX1 to TXn for the purpose of the operation of the touch sensor panel 100, and a sensing unit 110 which detects the touch and the touch position by receiving a sensing signal including information on the capacitance change amount changing according to the touch on the touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitude of the value may be changed depending on the embodiment.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

In the touch sensor panel 100 according to the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in the different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may be formed to include at least any one of silver ink, copper or carbon nanotube (CNT). Also, the drive electrode TX and the receiving electrode RX may be made of metal mesh or nano silver.

The drive unit 120 according to the embodiment of the present invention may apply a driving signal to the drive electrodes TX1 to TXn. In the embodiment of the present invention, one driving signal may be sequentially applied at a time to the first drive electrode TX1 to the n-th drive electrode TXn. The driving signal may be applied again repeatedly. This is only an example. The driving signal may be applied to the plurality of drive electrodes at the same time in accordance with the embodiment.

Through the receiving electrodes RX1 to RXm, the sensing unit 110 receives the sensing signal including information on a capacitance (Cm) 101 generated between the receiving electrodes RX1 to RXm and the drive electrodes TX1 to TXn to which the driving signal has been applied, thereby detecting whether or not the touch has occurred and where the touch has occurred. For example, the sensing signal may be a coupled signal of the driving signal applied to the drive electrode TX by the capacitance (CM) 101 generated between the receiving electrode RX and the drive electrode TX. As such, the process of sensing the driving signal applied from the first drive electrode TX1 to the n-th drive electrode TXn through the receiving electrodes RX1 to RXm can be referred to as a process of scanning the touch sensor panel 100.

For example, the sensing unit 110 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 101, and then converts the integrated current signal into voltage. The sensing unit 110 may further include an analog to digital converter (ADC) (not shown) which converts the integrated data by the receiver into digital data. Later, the digital data may be input to a processor (not shown) and processed to obtain information on the touch on the touch sensor panel 100. The sensing unit 110 may include the ADC and processor as well as the receiver.

A controller 130 may perform a function of controlling the operations of the drive unit 120 and the sensing unit 110. For example, the controller 130 generates and transmits a drive control signal to the drive unit 120, so that the driving signal can be applied to a predetermined drive electrode TX1 at a predetermined time. Also, the controller 130 generates and transmits the drive control signal to the sensing unit 110, so that the sensing unit 110 may receive the sensing signal from the predetermined receiving electrode RX at a predetermined time and perform a predetermined function.

In FIG. 1, the drive unit 120 and the sensing unit 110 may constitute a touch detection device (not shown) capable of detecting whether the touch has occurred on the touch sensor panel 100 according to the embodiment of the present invention or not and where the touch has occurred. The touch detection device according to the embodiment of the present invention may further include the controller 130. The touch detection device according to the embodiment of the present invention may be integrated and implemented on a touch sensing integrated circuit (IC, see reference numeral 150 of FIG. 12) in a touch input device 1000 including the touch sensor panel 100. The drive electrode TX and the receiving electrode RX included in the touch sensor panel 100 may be connected to the drive unit 120 and the sensing unit 110 included in touch sensing IC 150 through, for example, a conductive trace and/or a conductive pattern printed on a circuit board, or the like. The touch sensing IC 150 may be placed on a circuit board on which the conductive pattern has been printed, for example, a first printed circuit board (hereafter, referred to as a first PCB) indicated by a reference numeral 160 of FIG. 12. According to the embodiment, the touch sensing IC 150 may be mounted on a main board for operation of the touch input device 1000.

As described above, a capacitance (C) with a predetermined value is generated at each crossing of the drive electrode TX and the receiving electrode RX. When an object like a finger approaches close to the touch sensor panel 100, the value of the capacitance may be changed. In FIG. 1, the capacitance may represent a mutual capacitance (Cm). The sensing unit 110 senses such electrical characteristics, thereby being able to sense whether the touch has occurred on the touch sensor panel 100 or not and where the touch has occurred. For example, the sensing unit 110 is able to sense whether the touch has occurred on the surface of the touch sensor panel 100 comprised of a two-dimensional plane consisting of a first axis and a second axis.

More specifically, when the touch occurs on the touch sensor panel 100, the drive electrode TX to which the driving signal has been applied is detected, so that the position of the second axial direction of the touch can be detected. Likewise, when the touch occurs on the touch sensor panel 100, the capacitance change is detected from the reception signal received through the receiving electrode RX, so that the position of the first axial direction of the touch can be detected.

The mutual capacitance type touch sensor panel as the touch sensor panel 100 has been described in detail in the foregoing. However, in the touch input device 1000 according to the embodiment of the present invention, the touch sensor panel 100 for detecting whether or not the touch has occurred and where the touch has occurred may be implemented by using not only the above-described method but also any touch sensing method like a magnetic capacitance type method, a surface capacitance type method, a projected capacitance type method, a resistance film method, a surface acoustic wave (SAW) method, an infrared method, an optical imaging method, a dispersive signal technology, and an acoustic pulse recognition method, etc.

The touch sensor panel 100 for detecting where the touch has occurred in the touch input device 1000 according to the embodiment of the present invention may be positioned outside or inside a display module 200.

The display module of the touch input device 1000 according to the embodiment of the present invention may be a display panel included in a liquid crystal display (LCD), a plasma display panel (PDP), an organic light emitting diode (OLED), etc. Accordingly, a user may perform the input operation by touching the touch surface while visually identifying contents displayed on the display panel. Here, the display module 200 may include a control circuit which receives an input from an application processor (AP) or a central processing unit (CPU) on a main board for the operation of the touch input device 1000 and displays the contents that the user wants on the display panel. The control circuit may be mounted on a second printed circuit board (hereafter, referred to as a second PCB) (210) in FIGS. 11a to 13c. Here, the control circuit for the operation of the display module 200 may include a display panel control IC, a graphic controller IC, and a circuit required to operate other display panels 200.

Figure 2A:
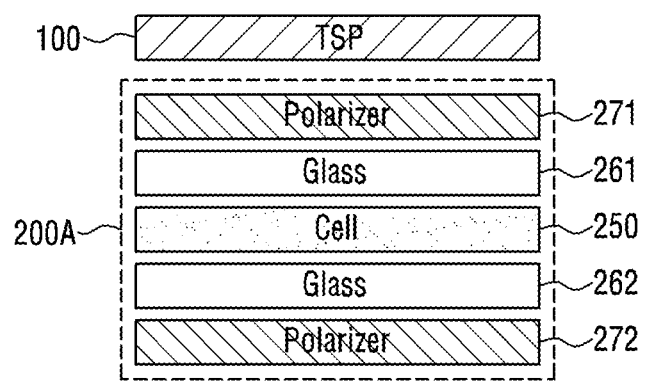
FIGS. 2a, 2b and 2c are conceptual views showing a relative position of the touch sensor panel with respect to a display module in a touch input device according to the embodiment of the present invention.
Figure 2B:
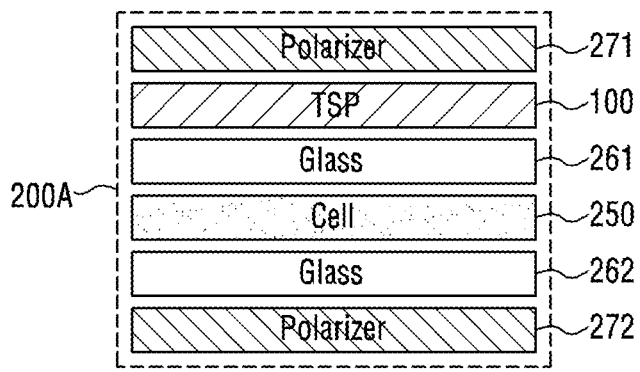
Figure 2C:
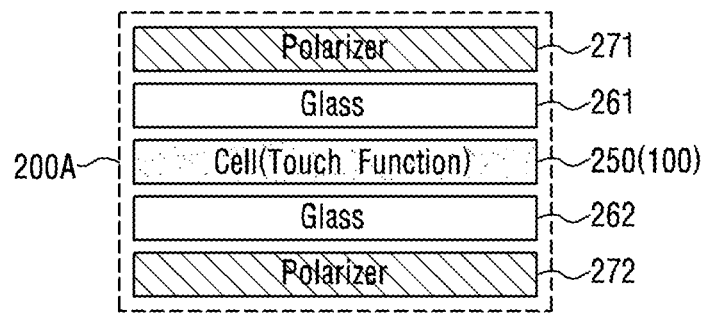

FIGS. 2a, 2b and 2c are conceptual views showing a relative position of the touch sensor panel with respect to the display module in the touch input device according to the embodiment of the present invention. While FIGS. 2a to 2c show an LCD panel as a display panel 200A included within the display module 200, this is just an example. Any display panel may be applied to the touch input device 1000 according to the embodiment of the present invention.

In this specification, the reference numeral 200A may designate the display panel included in the display module 200. As shown in FIG. 2, the LCD panel 200A may include a liquid crystal layer 250 including a liquid crystal cell, a first glass layer 261 and a second glass layer 262 which are disposed on both sides of the liquid crystal layer 250 and include electrodes, a first polarizer layer 271 formed on a side of the first glass layer 261 in a direction facing the liquid crystal layer 250, and a second polarizer layer 272 formed on a side of the second glass layer 262 in the direction facing the liquid crystal layer 250. It is clear to those skilled in the art that the LCD panel may further include other configurations for the purpose of performing the displaying function and may be transformed.

FIG. 2a shows that the touch sensor panel 100 of the touch input device 1000 is disposed outside the display module 200. The touch surface of the touch input device 1000 may be the surface of the touch sensor panel 100. In FIG. 2a, the top surface of the touch sensor panel 100 is able to function as the touch surface. Also, according to the embodiment, the touch surface of the touch input device 1000 may be the outer surface of the display module 200. In FIG. 2a, the bottom surface of the second polarizer layer 272 of the display module 200 is able to function as the touch surface. Here, in order to protect the display module 200, the bottom surface of the display module 200 may be covered with a cover layer (not shown) like glass.

FIGS. 2b and 2c show that the touch sensor panel 100 of the touch input device 1000 is disposed inside the display panel 200A. Here, in FIG. 2b, the touch sensor panel 100 for detecting the touch position is disposed between the first glass layer 261 and the first polarizer layer 271. Here, the touch surface of the touch input device 1000 is the outer surface of the display module 200. The top surface or bottom surface of the display module 200 in FIG. 2b may be the touch surface. FIG. 2c shows that the touch sensor panel 100 for detecting the touch position is included in the liquid crystal layer 250. Also, according to the embodiment, the touch sensor panel 100 may be implemented such that the electrical devices for the operation of the display panel 200A are used for the touch sensing. Here, the touch surface of the touch input device 1000 is the outer surface of the display module 200. The top surface or bottom surface of the display module 200 in FIG. 2c may be the touch surface. In FIGS. 2b and 2c, the top surface or bottom surface of the display module 200, which can be the touch surface, may be covered with a cover layer (not shown) like glass.

The foregoing has described whether the touch has occurred on the touch sensor panel 100 according to the embodiment of the present or not and where the touch has occurred. Further, through use of the touch sensor panel 100 according to the embodiment of the present, it is possible to detect the magnitude of the touch pressure as well as whether the touch has occurred or not and where the touch has occurred. Also, apart from the touch sensor panel 100, it is possible to detect the magnitude of the touch pressure by further including the pressure detection module which detects the touch pressure.

Figure 3:
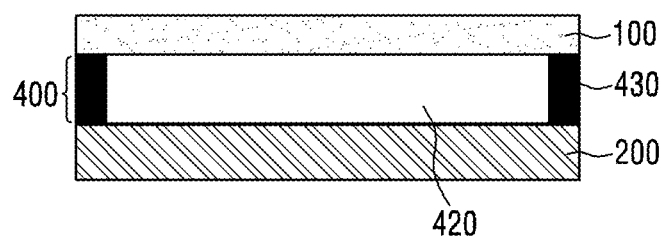
FIG. 3 is a cross sectional view of the touch input device configured to detect the touch position and touch pressure in accordance with a first embodiment of the present invention.

FIG. 3 is a cross sectional view of the touch input device configured to detect the touch position and touch pressure in accordance with a first embodiment of the present invention.

In the touch input device 1000 including the display module 200, the touch sensor panel 100 and the pressure detection module 400 which detect the touch position may be attached on the front side of the display module 200, As a result, the display screen of the display module 200 can be protected and the touch detection sensitivity of the touch sensor panel 100 can be improved.

Here, the pressure detection module 400 may be operated apart from the touch sensor panel 100 which detects the touch position. For example, the pressure detection module 400 may be configured to detect only the touch pressure independently of the touch sensor panel 100 which detects the touch position. Also, the pressure detection module 400 may be configured to be coupled to the touch sensor panel 100 which detects the touch position and to detect the touch pressure. For example, at least one of the drive electrode TX and the receiving electrode RX included in the touch sensor panel 100 which detects the touch position may be used to detect the touch pressure.

FIG. 3 shows that the pressure detection module 400 is coupled to the touch sensor panel 100 and detects the touch pressure. In FIG. 3, the pressure detection module 400 includes a spacer layer 420 which leaves a space between the touch sensor panel 100 and the display module 200. The pressure detection module 400 may include a reference potential layer spaced from the touch sensor panel 100 by the spacer layer 420. Here, the display module 200 may function as the reference potential layer.

The reference potential layer may have any potential which causes the change of the capacitance 101 generated between the drive electrode TX and the receiving electrode RX. For instance, the reference potential layer may be a ground layer having a ground potential. The reference potential layer may be the ground layer of the display module 200. Here, the reference potential layer may have a parallel plane with the two-dimensional plane of the display module 200.

As shown in FIG. 3, the touch sensor panel 100 is disposed apart from the display module 200, i.e., the reference potential layer. Here, depending on a method for adhering the touch sensor panel 100 to the display module 200, the spacer layer 420 may be implemented in the form of an air gap between the touch sensor panel 100 and the display module 200. The spacer layer 420 may be made of an impact absorbing material in accordance with the embodiment. The spacer layer 420 may be filled with a dielectric material in accordance with the embodiment.

Here, a double adhesive tape (DAT) 430 may be used to fix the touch sensor panel 100 and the display module 200. For example, the areas the touch sensor panel 100 and the display module 200 are overlapped with each other. The touch sensor panel 100 and the display module 200 are adhered to each other by adhering the edge portions of the touch sensor panel 100 and the display module 200 through use of the DAT 430. The rest portions of the touch sensor panel 100 and the display module 200 may be spaced apart from each other by a predetermined distance "d".

In general, even when the touch surface is touched without bending the touch sensor panel 100, the capacitance (Cm) 101 between the drive electrode TX and the receiving electrode RX is changed. That is, when the touch occurs on the touch sensor panel 100, the mutual capacitance (Cm) 101 may become smaller than a base mutual capacitance. This is because, when the conductive object like a finger approaches close to the touch sensor panel 100, the object functions as the ground GND, and then a fringing capacitance of the mutual capacitance (Cm) 101 is absorbed in the object. The base mutual capacitance is the value of the mutual capacitance between the drive electrode TX and the receiving electrode RX when there is no touch on the touch sensor panel 100.

When the object touches the top surface, i.e., the touch surface of the touch sensor panel 100 and a pressure is applied to the top surface, the touch sensor panel 100 may be bent. Here, the value of the mutual capacitance (Cm) 101 between the drive electrode TX and the receiving electrode RX may be more reduced. This is because the bend of the touch sensor panel 100 causes the distance between the touch sensor panel 100 and the reference potential layer to be reduced from "d" to "d'", so that the fringing capacitance of the mutual capacitance (Cm) 101 is absorbed in the reference potential layer as well as in the object. When a nonconductive object touches, the change of the mutual capacitance (Cm) 101 is simply caused by only the change of the distance "d-d'" between the touch sensor panel 100 and the reference potential layer.

As described above, the touch input device 1000 is configured to include the touch sensor panel 100 and the pressure detection module 400 on the display module 200, so that not only the touch position but also the touch pressure can be simultaneously detected.

However, as shown in FIG. 3, when the pressure detection module 400 as well as the touch sensor panel 100 is disposed on the display module 200, the display properties of the display module is deteriorated. Particularly, when the air gap 420 is included on the display module 200, the visibility and optical transmittance of the display module may be lowered.

Accordingly, in order to prevent such problems, the air gap is not disposed between the display module 200 and the touch sensor panel 100 for detecting the touch position. Instead, the touch sensor panel 100 and the display module 200 can be completely laminated by means of an adhesive like an optically clear adhesive (OCA).

FIGS. 4a to 4f show a touch input device according to a second embodiment of the present invention. In the touch input device 1000 according to the second embodiment of the present invention, the lamination is made by an adhesive between the touch sensor panel 100 and the display module 200 for detecting the touch position. As a result, the display color clarity, visibility and optical transmittance of the display module 200, which can be recognized through the touch surface of the touch sensor panel 100, can be improved.

Figure 4A:
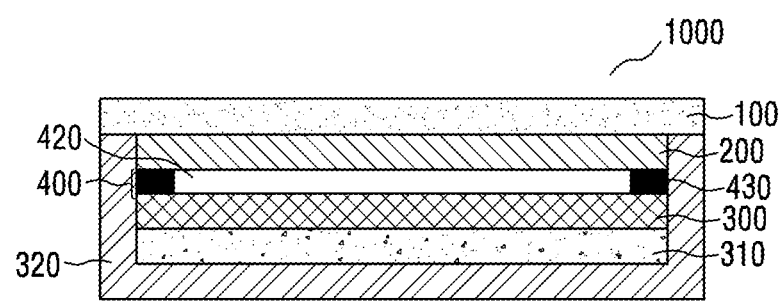
FIGS. 4a to 4f show a touch input device according to a second embodiment of the present invention.
Figure 4B:
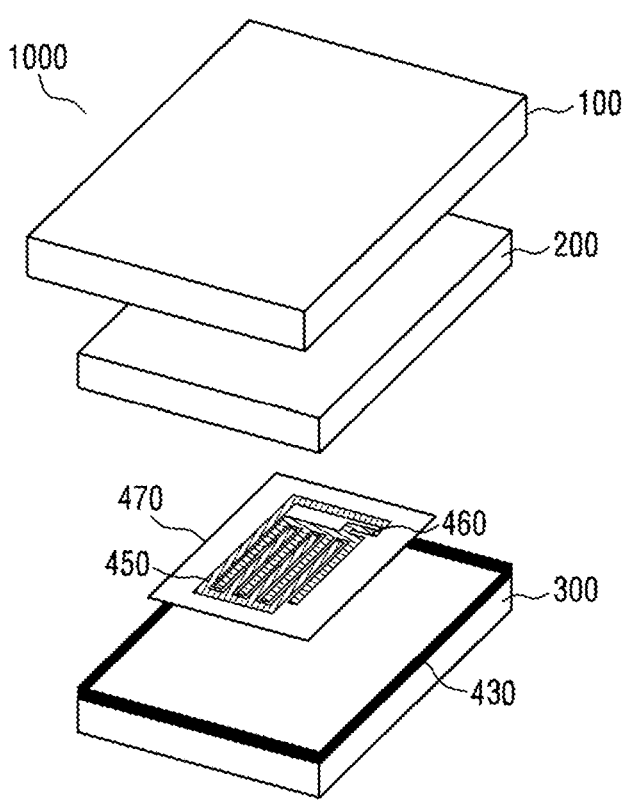

In the description with reference to FIGS. 4a to 4f, it is shown that as the touch input device 1000 according to the second embodiment of the present invention, the touch sensor panel 100 is laminated and attached on the display module 200 by means of an adhesive. However, the touch input device 1000 according to the second embodiment of the present invention may include, as shown in FIGS. 2*b* and 2*c*, that the touch sensor panel 100 is disposed inside the display module 200. More specifically, while FIGS. 4*a* and 4*b* show that the touch sensor panel 100 covers the display module 200, the touch input device 1000 which includes the touch sensor panel 100 disposed inside the display module 200 and includes the display module 200 covered with a cover layer like glass may be used as the second embodiment of the present invention.

The touch input device 1000 according to the embodiment of the present invention may include an electronic device including the touch screen, for example, a cell phone, a personal data assistant (PDA), a smart phone, a tablet personal computer, an MP3 player, a laptop computer, etc.

In the touch input device 1000 according to the embodiment of the present invention, a substrate 300, together with an outermost cover 320 of the touch input device 1000, functions as, for example, a housing which surrounds a mounting space 310, etc., where the circuit board and/or battery for operation of the touch input device 1000 are placed. Here, the circuit board for operation of the touch input device 1000 may be a main board. A central processing unit (CPU), an application processor (AP) or the like may be mounted on the circuit board. Due to the substrate 300, the display module 200 is separated from the circuit board and/or battery for operation of the touch input device 1000. Due to the substrate 300, electrical noise generated from the display module 200 can be blocked.

The touch sensor panel 100 or front cover layer of the touch input device 1000 may be formed wider than the display module 200, the substrate 300, and the mounting space 310. As a result, the cover 320 is formed such that the cover 320, together with the touch sensor panel 100, surrounds the display module 200, the substrate 300, and the mounting space 310.

The touch input device 1000 according to the second embodiment of the present may detect the touch position through the touch sensor panel 100 and may detect the touch pressure by disposing the pressure detection module 400 between the display module 200 and the substrate 300. Here, the touch sensor panel 100 may be disposed inside or outside the display module 200. The pressure detection module 400 is formed to include, for example, the spacer layer 420 consisting of the air gap. This will be described in detail with reference to FIGS. 4*b* to 4*f*. The spacer layer 420 may be made of an impact absorbing material in accordance with the embodiment. The spacer layer 420 may be filled with a dielectric material in accordance with the embodiment.

FIG. 4*b* is a perspective view of the touch input device according to the second embodiment of the present invention. As shown in FIG. 4*b*, in the touch input device 1000 according to the embodiment of the present, the pressure detection module 400 may include the spacer layer 420 which leaves a space between the display module 200 and the substrate 300 and may include electrodes 450 and 460 disposed within the spacer layer 420. Hereafter, for the purpose of clearly distinguishing the electrodes 450 and 460 from the electrode included in the touch sensor panel 100, the electrodes 450 and 460 for detecting the pressure are designated as pressure electrodes 450 and 460. Here, since the pressure electrodes 450 and 460 are included in the rear side instead of in the front side of the display panel, the pressure electrodes 450 and 460 may be made of an opaque material as well as a transparent material.

Here, the adhesive tape 430 with a predetermined thickness may be formed along the border of the upper portion of the substrate 300 in order to maintain the spacer layer 420. While FIG. 4*b* shows the adhesive tape 430 is formed on the entire border (e.g., four sides of the quadrangle) of the substrate 300, the adhesive tape 430 may be formed only on at least some (e.g., three sides of the quadrangle) of the border of the substrate 300. According to the embodiment, the adhesive tape 430 may be formed on the top surface of the substrate 300 or on the bottom surface of the display module 200. The adhesive tape 430 may be a conductive tape such that the substrate 300 and the display module 200 have the same electric potential. The adhesive tape 430 may be a double adhesive tape. In the embodiment of the present invention, the adhesive tape 430 may be made of an inelastic material. In the embodiment of the present invention, when a pressure is applied to the display module 200, the display module 200 may be bent. Therefore, the magnitude of the touch pressure can be detected even though the adhesive tape 430 is not transformed by the pressure.

Figure 4C:
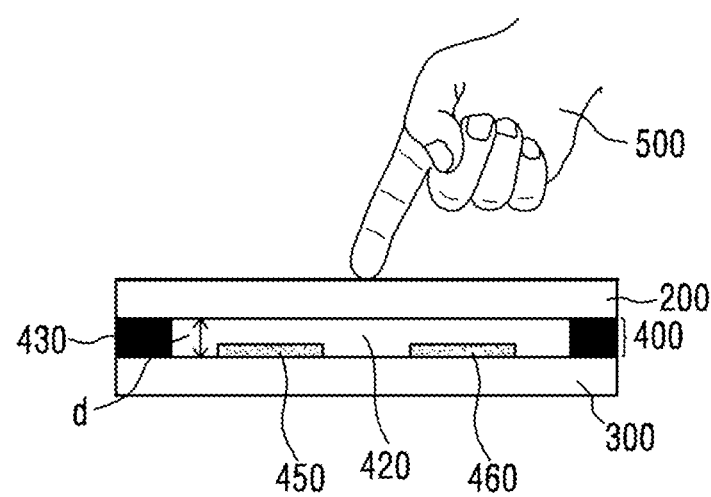

FIG. 4*c* is a cross sectional view of the touch input device including a pressure electrode pattern according to the embodiment of the present invention. As shown in FIG. 4*c*, the pressure electrodes 450 and 460 according to the embodiment of the present invention may be formed within the spacer layer 420 and on the substrate 300.

The pressure electrode for detecting the pressure may include the first electrode 450 and the second electrode 460. Here, any one of the first and the second electrodes 450 and 460 may be a drive electrode and the other may be a receiving electrode. A driving signal is applied to the drive electrode, and a sensing signal may be obtained through the receiving electrode. When voltage is applied, the mutual capacitance may be generated between the first electrode 450 and the second electrode 460.

Figure 4D:
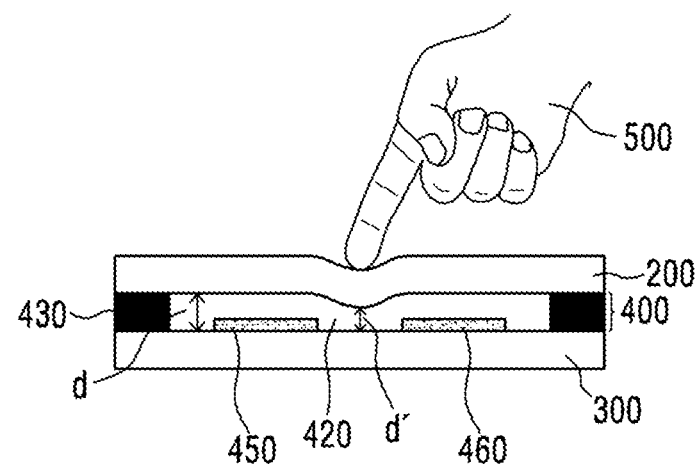

FIG. 4*d* is a cross sectional view when a pressure is applied to the touch input device 1000 shown in FIG. 4*c*. The bottom surface of the display module 200 may have a ground potential so as to block the noise. When the pressure is applied to the surface of the touch sensor panel 100 by an object 500, the touch sensor panel 100 and the display module 200 may be bent or pressed. As a result, the distance "d" between the ground potential surface and the pressure electrode patterns 450 and 460 may be decreased to "d'". In this case, due to the decrease of the distance "d", the fringing capacitance is absorbed in the bottom surface of the display module 200, so that the mutual capacitance between the first electrode 450 and the second electrode 460 may be reduced. Therefore, the magnitude of the touch pressure can be calculated by obtaining the reduction amount of the mutual capacitance from the sensing signal obtained through the receiving electrode.

In the touch input device 1000 according to the embodiment of the present invention, the display module 200 may be bent or pressed by the touch pressure. The display module 200 may be bent or pressed in such a manner as to show the transformation caused by the touch. When the display module 200 is bent or pressed according to the embodiment, a position showing the biggest transformation may not match the touch position. However, the display module 200 may be shown to be bent at least at the touch position. For example, when the touch position approaches close to the border, edge, etc., of the display module 200, the most bent or pressed position of the display module 200 may not match the touch position, however, the display module 200 may be shown to be bent or pressed at least at the touch position.

Here, the top surface of the substrate 300 may also have the ground potential in order to block the noise. Therefore, in order to prevent a short-circuit from occurring between the substrate 300 and the pressure electrodes 450 and 460, the pressure electrodes 450 and 460 may be formed on an insulation layer 470. FIG. 9 shows an attachment structure of the pressure electrode according to the embodiment of the present invention. Referring to FIG. 9a, the first insulation layer 470 is positioned on the substrate 300, and then the pressure electrodes 450 and 460 are formed. Also, according to the embodiment, the first insulation layer 470 on which the pressure electrodes 450 and 460 have been formed may be attached on the substrate 300. Also, the pressure electrode according to the embodiment may be formed by positioning a mask, which has a through-hole corresponding to the pressure electrode pattern, on the substrate 300 or on the first insulation layer 470 positioned on the substrate 300, and then by spraying a conductive material.

Also, when the bottom surface of the display module 200 has the ground potential, the pressure electrodes 450 and 460 may be covered with an additional second insulation layer 471 in order to prevent a short-circuit from occurring between the display module 200 and the pressure electrode 450 and 460 positioned on the substrate 300. Also, the pressure electrodes 450 and 460 formed on the first insulation layer 470 are covered with the additional second insulation layer 471 and then are integrally attached on the substrate 300, so that the pressure detection module 400 is formed.

The pressure electrode 450 and 460 attachment structure and method, which have been described with reference to FIG. 9a, may be applied to the attachment of the pressure electrodes 450 and 460 to the display module 200. The attachment of the pressure electrodes 450 and 460 to the display module 200 will be described in more detail with reference to FIG. 4e.

Also, depending on the kind and/or implementation method of the touch input device 1000, the substrate 300 or the display module 200 on which the pressure electrodes 450 and 460 are attached may not have the ground potential or may have a weak ground potential. In this case, the touch input device 1000 according to the embodiment of the present may further include a ground electrode (not shown) between the first insulation layer 470 and either the substrate 300 or the display module 200. According to the embodiment, another insulation layer (not shown) may be included between the ground electrode and either the substrate 300 or the display module 200. Here, the ground electrode (not shown) is able to prevent the size of the capacitance generated between the first electrode 450 and the second electrode 460, which are pressure electrodes, from increasing excessively.

The above-described method for forming and attaching pressure electrode 450 and 460 can be applied in the same manner to the following embodiments.

Figure 4E:
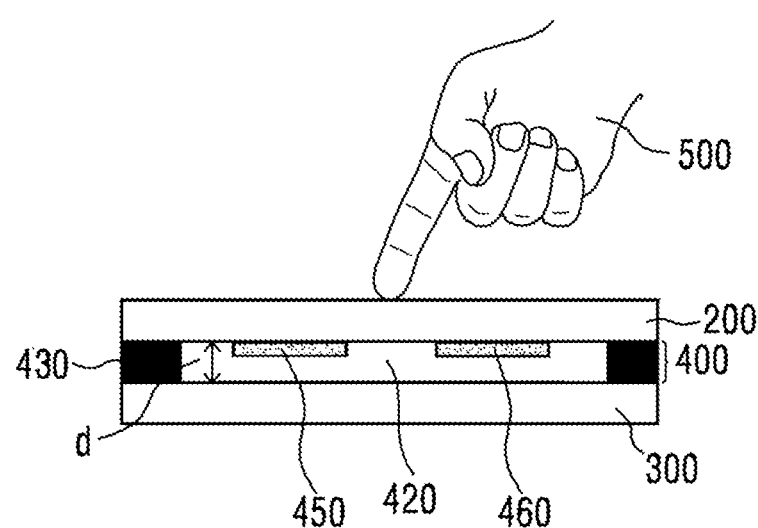

FIG. 4e shows that the pressure electrodes 450 and 460 according to the embodiment of the present invention are formed on the bottom surface of the display module 200. Here, the substrate 300 may have the ground potential. Therefore, the distance "d" between the substrate 300 and the pressure electrodes 450 and 460 is reduced by touching the touch surface of the touch sensor panel 100. Consequently, this may cause the change of the mutual capacitance between the first electrode 450 and the second electrode 460.

Figure 7A:
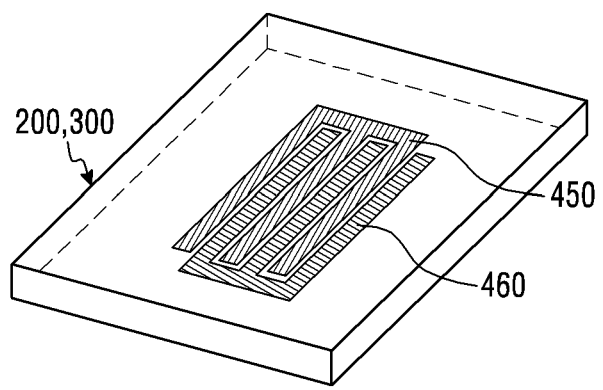
FIGS. 7a to 7e show a pressure electrode pattern according to the embodiment of the present invention.
Figure 7B:
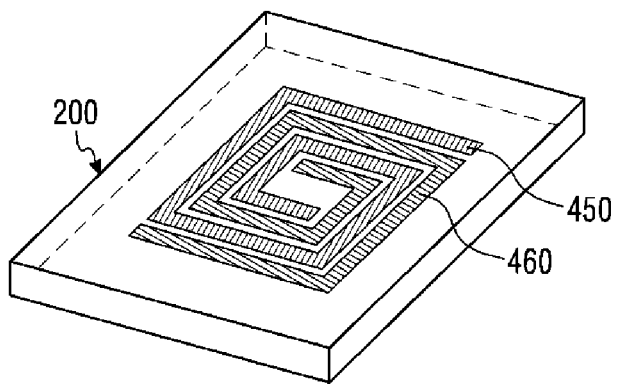
Figure 7C:
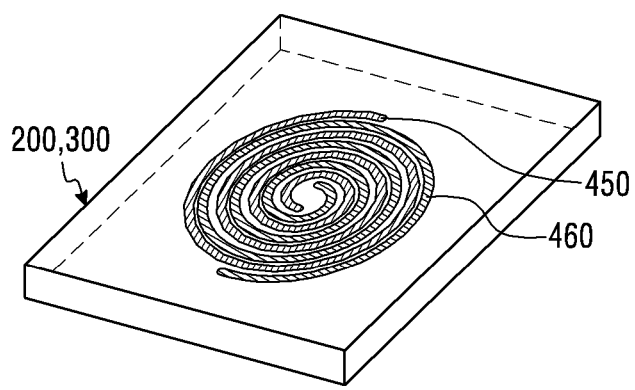

FIGS. 7a to 7e show the pressure electrode patterns according to the embodiment of the present invention. FIGS. 7a to 7c show that the first electrode 450 and the second electrode 460 are formed on the substrate 300 or on the bottom surface of the display module 200. The capacitance between the first electrode 450 and the second electrode 460 may be changed depending on the distance between the reference potential layer (display module 200 or substrate 300) and both the first electrode 450 and the second electrode 460.

When the magnitude of the touch pressure is detected as the mutual capacitance between the first electrode 450 and the second electrode 460 is changed, it is necessary to form the patterns of the first electrode 450 and the second electrode 460 so as to generate the range of the capacitance required to improve the detection accuracy. With the increase of a facing area or facing length of the first electrode 450 and the second electrode 460, the size of the capacitance that is generated may become larger. Therefore, the pattern can be designed by adjusting the size of the facing area, facing length and facing shape of the first electrode 450 and the second electrode 460 in accordance with the range of the necessary capacitance. FIGS. 7b and 7c show that the first electrode 450 and the second electrode 460 are formed in the same layer, and show that the pressure electrode is formed such that the facing length of the first electrode 450 and the second electrode 460 becomes relatively longer.

In the foregoing, it is shown that the first electrode 450 and the second electrode 460 are formed in the same layer. However, it can be considered that the first electrode 450 and the second electrode 460 are formed in different layers in accordance with the embodiment. FIG. 9b shows an attachment structure in which the first electrode 450 and the second electrode 460 are formed in different layers. As shown in FIG. 9b, the first electrode 450 may be formed on the first insulation layer 470, and the second electrode 460 may be formed on the second insulation layer 471 positioned on the first electrode 450. According to the embodiment, the second electrode 460 may be covered with a third insulation layer 472. Here, since the first electrode 450 and the second electrode 460 are disposed in different layers, they can be implemented so as to overlap each other. For example, the first electrode 450 and the second electrode 460 may be formed similarly to the pattern of the drive electrode TX and receiving electrode RX which are arranged in the form of M×N array and are included in the touch sensor panel 100 described with reference to FIG. 1. Here, M and N may be natural numbers greater than 1.

In the foregoing, it is shown that the touch pressure is detected from the change of the mutual capacitance between the first electrode 450 and the second electrode 460. However, the pressure electrodes 450 and 460 may be configured to include only any one of the first electrode 450 and the second electrode 460. In this case, it is possible to detect the magnitude of the touch pressure by detecting the change of the capacitance between the one pressure electrode and the ground layer (either the display module 200 or the substrate 300).

Figure 7D:
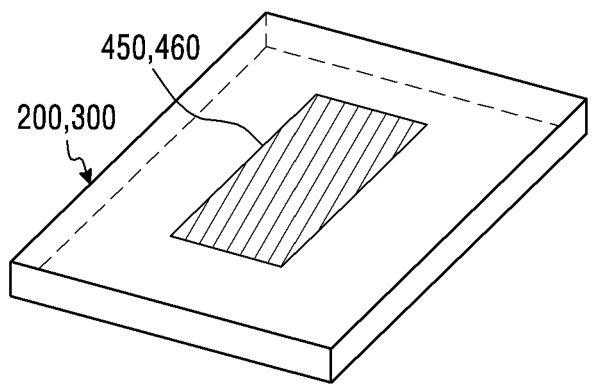

For instance, in FIG. 4c, the pressure electrode may be configured to include only the first electrode 450. Here, the magnitude of the touch pressure can be detected by the change of the capacitance between the first electrode 450 and the display module 200, which is caused by the distance change between the display module 200 and the first electrode 450. Since the distance "d" is reduced with the increase of the touch pressure, the capacitance between the display module 200 and the first electrode 450 may be increased with the increase of the touch pressure. This can be applied in the same manner to the embodiment related to FIG. 4e. Here, the pressure electrode should not necessary have a comb teeth shape or a trident shape, which is required to improve the detection accuracy of the mutual capacitance change amount. The pressure electrode may have, as shown in FIG. 7d, a plate shape (e.g., quadrangular plate).

FIG. 9c shows an attachment structure in which the pressure electrode is formed to include only the first electrode 450. As shown in FIG. 9c, the first electrode 450 may be formed on the first insulation layer 470 positioned on the substrate 300 or display module 200. Also, according to the embodiment, the first electrode 450 may be covered with the second insulation layer 471.

Figure 4F:
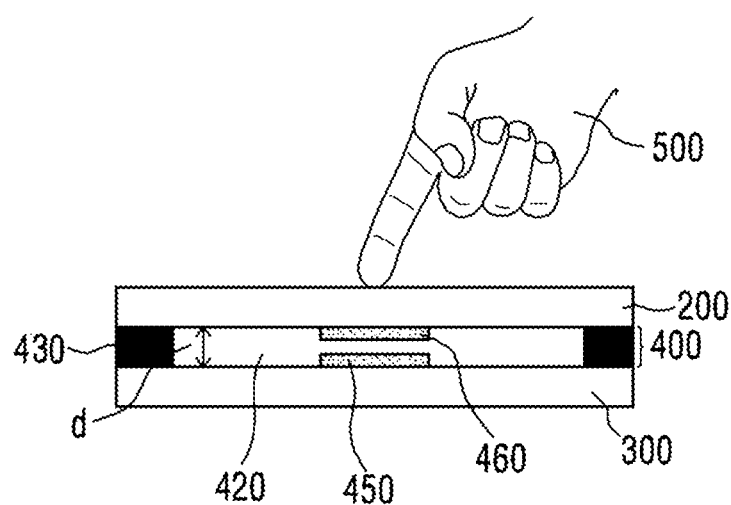

FIG. 4f shows that the pressure electrodes 450 and 460 are formed within the spacer layer 420 and on the top surface of the substrate 300 and on the bottom surface of the display module 200. The pressure electrode pattern for detecting the pressure may include the first electrode 450 and the second electrode 460. Here, any one of the first electrode 450 and the second electrode 460 may be formed on the substrate 300, and the other may be formed on the bottom surface of the display module 200. FIG. 4f shows that the first electrode 450 is formed on the substrate 300, and the second electrode 460 is formed on the bottom surface of the display module 200.

When the pressure is applied to the surface of the touch sensor panel 100 by the object 500, the touch sensor panel 100 and the display module 200 may be bent or pressed. As a result, the distance "d" between the first electrode 450 and the second electrode 460 may be reduced. In this case, the mutual capacitance between the first electrode 450 and the second electrode 460 may be increased with the reduction of the distance "d". Therefore, the magnitude of the touch pressure can be calculated by obtaining the increase amount of the mutual capacitance from the sensing signal obtained through the receiving electrode. Here, the pressure electrode patterns of the first electrode 450 and the second electrode 460 may have a shape as shown in FIG. 7d respectively. That is, since the first electrode 450 and the second electrode 460 are formed in different layers in FIG. 4f, the first electrode 450 and the second electrode 460 should not necessarily have a comb teeth shape or a trident shape, and may have a plate shape (e.g., quadrangular plate).

FIG. 9d shows an attachment structure in which the first electrode 450 is attached on the substrate 300 and the second electrode 460 is attached to the display module 200. As shown in FIG. 9d, the first electrode 450 may be positioned on the first insulation layer 470-2 formed on the substrate 300 and may be covered with the second insulation layer 471-2. Also, the second electrode 460 may be positioned on the first insulation layer 470-1 formed on the bottom surface of the display module 200 and may be covered with the second insulation layer 471-1.

As with the description related to FIG. 9a, when substrate 300 or the display module 200 on which the pressure electrodes 450 and 460 are attached may not have the ground potential or may have a weak ground potential, a ground electrode (not shown) may be further included between the first insulation layers 470, 470-1, and 470-2 in FIGS. 9a to 9d. Here, an additional insulation layer (not shown) may be further included between the ground electrode (not shown) and either the substrate 300 or the display module 200 on which the pressure electrodes 450 and 460 are attached.

FIGS. 5a to 5i show a touch input device according to a third embodiment of the present invention. The third embodiment of the present invention is similar to the second embodiment described with reference to FIGS. 4a to 4f. Hereafter, the following description will focus on differences between the second and third embodiments.

Figure 5A:
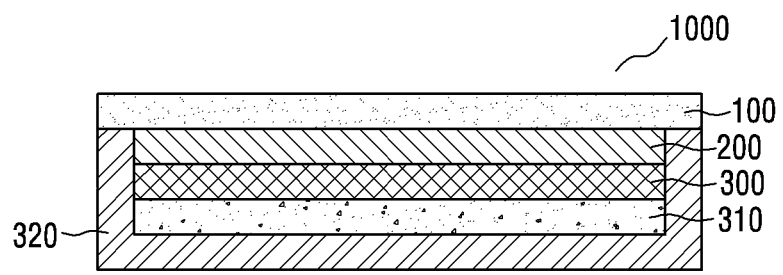
FIGS. 5a to 5i show a touch input device according to a third embodiment of the present invention.

FIG. 5a is a cross sectional view of the touch input device according to the third embodiment of the present invention.

In the touch input device 1000 according to the second embodiment of the present invention, the touch pressure can be detected by using the air gap and/or potential layer which are positioned inside or outside the display module 200 without manufacturing a separate spacer layer and/or reference potential layer. This will be described in detail with reference to FIGS. 5b to 5i.

Figure 5B:
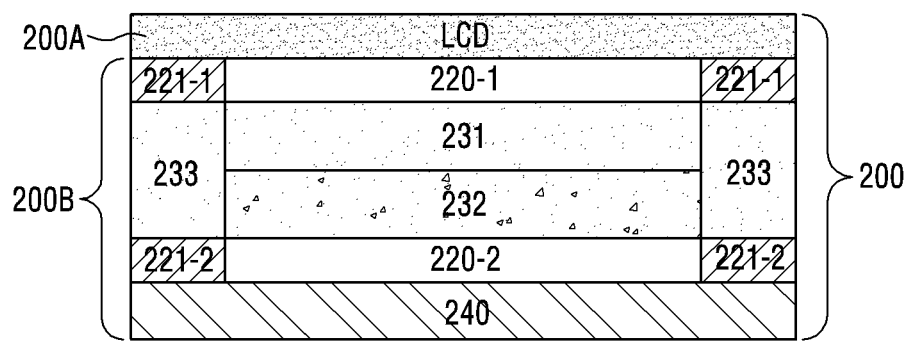

FIG. 5b is an exemplary cross sectional view of the display module 200 which can be included in the touch input device 1000 according to the third embodiment of the present invention. FIG. 5b shows an LCD module as the display module 200. As shown in FIG. 5b, the LCD module 200 may include an LCD panel 200A and a backlight unit 200B. The LCD panel 200A cannot emit light in itself but simply performs a function to block or transmit the light. Therefore, a light source is positioned in the lower portion of the LCD panel 200A and light is illuminated onto the LCD panel 200A, so that a screen displays not only brightness and darkness but information with various colors. Since the LCD panel 200A is a passive device and cannot emit the light in itself, a light source having a uniform luminance distribution is required on the rear side. The structures and functions of the LCD panel 200A and the backlight unit 200B have been already known to the public and will be briefly described below.

The backlight unit 200B for the LCD panel 200A may include several optical parts. In FIG. 5b, the backlight unit 200B may include a light diffusing and light enhancing sheet 231, a light guide plate 232, and a reflection plate 240. Here, the backlight unit 200B may include a light source (not shown) which is formed in the form of a linear light source or point light source and is disposed on the rear and/or side of the light guide plate 232. According to the embodiment, a support 233 may be further included on the edges of the light guide plate 232 and the light diffusing and light enhancing sheet 231.

The light guide plate 232 may generally convert lights from the light source (not shown) in the form of a linear light source or point light source into light from a light source in the form of a surface light source, and allow the light to proceed to the LCD panel 200A.

A part of the light emitted from the light guide plate 232 may be emitted to a side opposite to the LCD panel 200A and be lost. The reflection plate 240 may be positioned below the light guide plate 232 so as to cause the lost light to be incident again on the light guide plate 232, and may be made of a material having a high reflectance.

The light diffusing and light enhancing sheet 231 may include a diffuser sheet and/or a prism sheet. The diffuser sheet functions to diffuse the light incident from the light guide plate 232. For example, light scattered by the pattern of the light guide plate 232 comes directly into the eyes of the user, and thus, the pattern of the light guide plate 232 may be shown as it is. Moreover, since such a pattern can be clearly sensed even after the LCD panel 200A is mounted, the diffuser sheet is able to perform a function to scatter the pattern of the light guide plate 232.

After the light passes through the diffuser sheet, the luminance of the light is rapidly reduced. Therefore, the prism sheet may be included in order to improve the luminance of the light by focusing the light again.

The backlight unit 200B may include a configuration different from the above-described configuration in accordance with the technical change and development and/or the embodiment. The backlight unit 200B may further include an additional configuration as well as the foregoing configuration. Also, in order to protect the optical configuration of the backlight unit 200B from external impacts and contamination, etc., due to the introduction of the alien substance, the backlight unit 200B according to the embodiment of the present may further include, for example, a protection sheet on the prism sheet. The backlight unit 200B may also further include a lamp cover in accordance with the embodiment so as to minimize the optical loss of the light source. The backlight unit 200B may also further include a frame which maintains a shape enabling the light diffusing and light enhancing sheet 231, the light guide plate 232, a lamp (not shown), and the like, which are main components of the backlight unit 200B, to be exactly dissembled and assembled together in accordance with an allowed dimension. Also, the each of the components may be comprised of at least two separate parts. For example, the prism sheet may include two prism sheets.

Here, a first air gap 220-2 may be positioned between the light guide plate 232 and the reflection plate 240. As a result, the lost light from the light guide plate 232 to the reflection plate 240 can be incident again on the light guide plate 232 by the reflection plate 240. Here, between the light guide plate 232 and the reflection plate 240, for the purpose of maintaining the air gap 220-2, a double adhesive tape 221-2 may be included on the edges of the light guide plate 232 and the reflection plate 240.

Also, according to the embodiment, the backlight unit 200B and the LCD panel 200A may be positioned with the second air gap 220-1 placed therebetween. This intends to prevent that the impact from the LCD panel 200A is transmitted to the backlight unit 200B. Here, between the backlight unit 200B and the LCD panel 200A, a double adhesive tape 221-1 may be included on the edges of the LCD panel 200A and the backlight unit 200B.

As described above, the display module 200 may be configured to include in itself the air gap such as the first air gap 220-2 and/or the second air gap 220-1. Also, the air gap may be included between a plurality of the layers of the light diffusing and light enhancing sheet 231. In the foregoing, while the LCD module has been described, the air gap may be included within the structure of another display module.

Figure 5C:
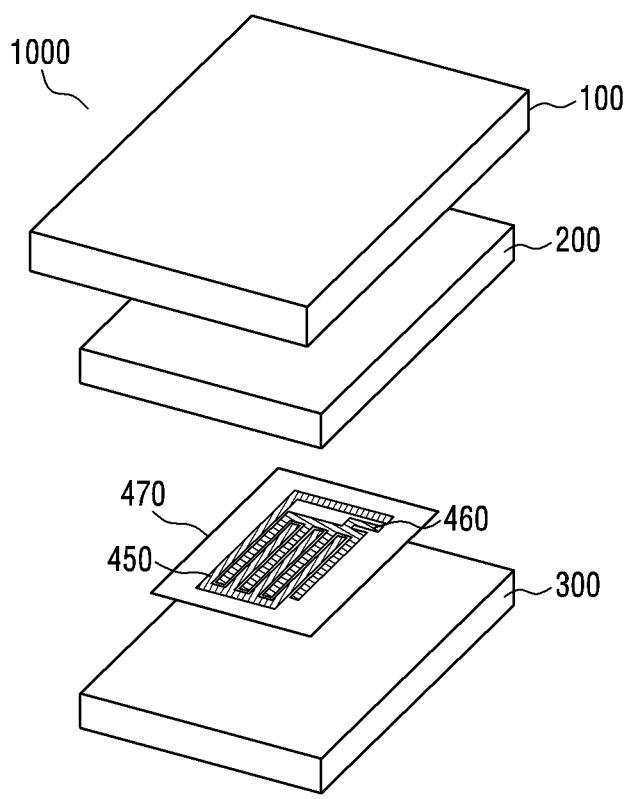

Therefore, for detecting the touch pressure, the touch input device 1000 according to the third embodiment of the present invention may make use of the air gap which has been already positioned inside or outside the display module 200 without manufacturing a separate spacer layer. The air gap which is used as the spacer layer may be not only the first air gap 220-2 and/or the second air gap 220-1 which are described with reference to FIG. 5b but also any air gap included inside the display module 200. Also, the air gap which is used as the spacer layer may be an air gap included outside the display module 200. As such, the manufacture of the touch input device 1000 capable of detecting the touch pressure reduces manufacturing cost and/or simplifies the manufacturing process. FIG. 5c is a perspective view of the touch input device according to the third embodiment of the present invention. In FIG. 5c, unlike the second embodiment shown in FIG. 4b, the double adhesive tape 430 for maintaining the spacer layer 420 may not be included.

Figure 5D:
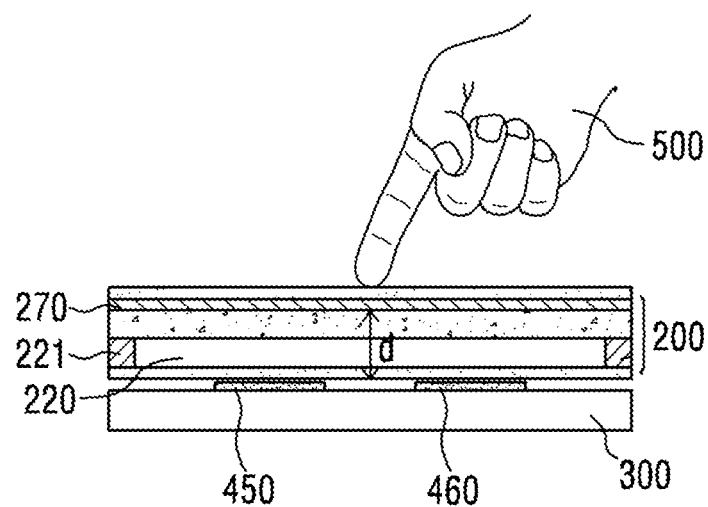
Figure 5E:
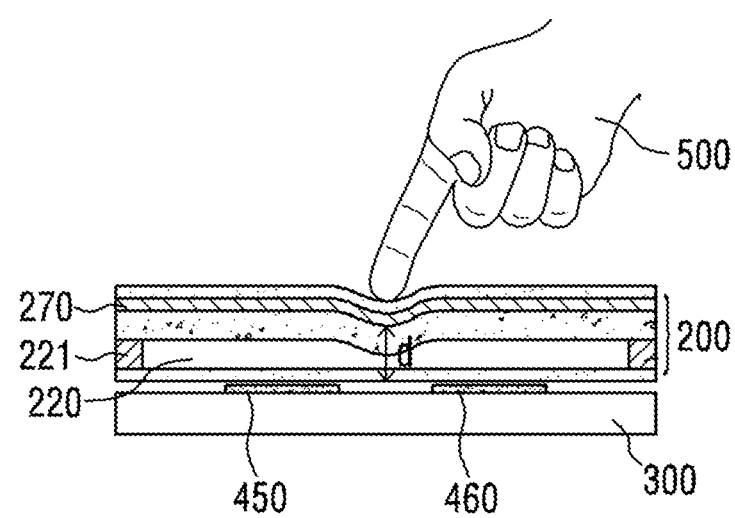

FIG. 5d is a cross sectional view of the touch input device according to the third embodiment. As shown in FIG. 5d, between the display module 200 and the substrate 300, the pressure electrodes 450 and 460 may be formed on the substrate 300. In FIGS. 5d to 5i, the pressure electrodes 450 and 460 are shown exaggeratedly thick for convenience of description. However, since the pressure electrodes 450 and 460 can be implemented in the form of a sheet, the thickness of the first electrode 450 and the second electrode 460 may be very small. Likewise, although the distance between the display module 200 and the substrate 300 is also shown exaggeratedly large, the display module 200 and the substrate 300 may be implemented to have a very small distance therebetween. FIGS. 5d and 5e show that the display module 200 and the pressure electrodes 450 and 460 are spaced apart from each other so as to represent that the first electrode 450 and the second electrode 460 have been formed on the substrate 300. However, this is for description only. The display module 200 and the first and second electrodes 450 and 460 may not be spaced apart from each other.

Here, FIG. 5d shows that the display module 200 includes a spacer layer 220 and a reference potential layer 270.

The spacer layer 220 may be, as described with reference to FIG. 5b, the first air gap 220-2 and/or the second air gap 220-1 which are included during the manufacture of the display module 200. When the display module 200 includes one air gap, the air gap may function as the spacer layer 220. When the display module 200 includes a plurality of air gaps, the plurality of air gaps may collectively function as the spacer layer 220. FIGS. 5d, 5e, 5h and 5i show that the display module 200 functionally includes one spacer layer 220.

According to the embodiment of the present invention, the touch input device 1000 may include the reference potential layer 270 which is positioned above the spacer layer 220 within the display panel 200A of FIGS. 2a to 2c. The reference potential layer 270 may be a ground potential layer which is included in itself during the manufacture of the display module 200. For example, in the display panel 200A shown in FIGS. 2a to 2c, an electrode (not shown) for blocking the noise may be included between the first polarizer layer 271 and the first glass layer 261. The electrode for blocking the noise may be composed of ITO and may function as the ground. Within the display module 200, the reference potential layer 270 may be located at any position causing the spacer layer 220 to be placed between the reference potential layer 270 and the pressure electrodes 450 and 460. Not only the above-described blocking electrode but also an electrode having any potential may be used as the reference potential layer 270. For example, the reference potential layer 270 may be a common electrode potential (Vcom) layer of the display module 200.

Particularly, as part of an effort to reduce the thickness of the device including the touch input device 1000, the display module 200 may not be surrounded by a separate cover or frame. In this case, the bottom surface of the display module 200, which faces the substrate 300, may be the reflection plate 240 and/or a nonconductor. In this case, the bottom surface of the display module 200 cannot have the ground potential. As mentioned, even when the bottom surface of the display module 200 cannot function as the reference potential layer, it is possible to detect the touch pressure by using any potential layer positioned within the display module 200 as the reference potential layer 270 through use of the touch input device 1000 according to the embodiment of the present invention.

FIG. 5e is a cross sectional view of a case where a pressure has been applied to the touch input device 1000 shown in FIG. 5d. When the pressure is applied to the surface of the touch sensor panel 100 by the object 500, the touch sensor panel 100 or the display module 200 may be bent or pressed. Here, the distance "d" between the reference potential layer 270 and the pressure electrode patterns 450 and 460 may be decreased to "d'" by the spacer layer 220 positioned within the display module 200. In this case, due to the decrease of the distance "d", the fringing capacitance is absorbed in the reference potential layer 270, so that the mutual capacitance between the first electrode 450 and the second electrode 460 may be reduced. Therefore, the magnitude of the touch pressure can be calculated by obtaining the reduction amount of the mutual capacitance from the sensing signal obtained through the receiving electrode.

In the touch sensor panel 100 according to the embodiment of the present invention, the display module 200 may be bent or pressed by the touch pressure. Here, as shown in FIG. 5e, due to the spacer layer 220, the layer positioned below the spacer layer 220 (e.g., the reflection plate) may not be bent or pressed or may be less bent or pressed. While FIG. 5e shows that the lowest portion of the display module 200 is not bent or pressed at all, this is just an example. The lowest portion of the display module 200 may be bent or pressed. However, the degree to which the lowest portion of the display module 200 is bent or pressed can be reduced by the spacer layer 220.

Since the attachment structure of the pressure electrode according to the third embodiment is the same as that described with reference to the second embodiment, the description thereof will be omitted.

Figure 5F:
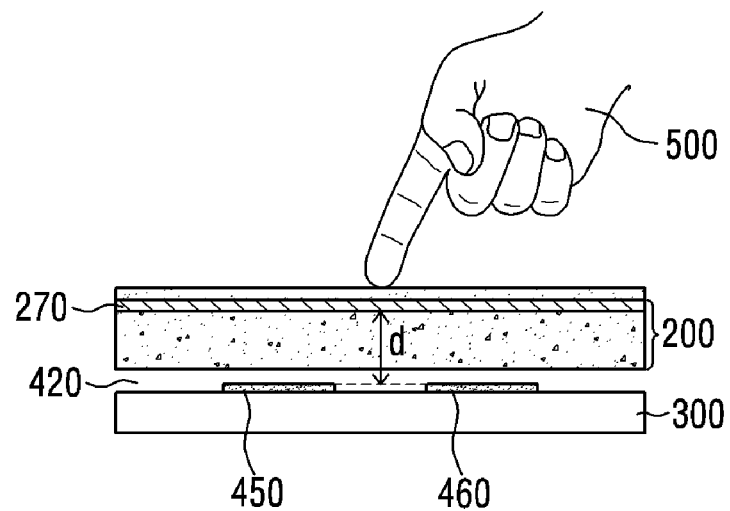
Figure 5G:
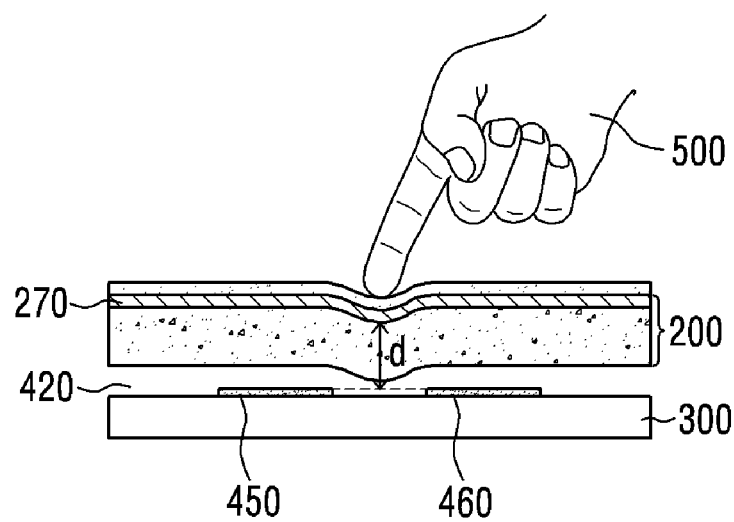

FIG. 5f is a cross sectional view of the touch input device including the pressure electrode pattern according to the modification of the embodiment described with reference to FIG. 5d. FIG. 5f shows that the spacer layer 220 is positioned between the display module 200 and the substrate 300. When the touch input device 1000 including the display module 200 is manufactured, the display module 200 is not completely attached to the substrate 300, so that the air gap 420 may be created. Here, by using the air gap 420 as the spacer layer for detecting the touch pressure, it is possible to reduce the time and cost intentionally required for manufacturing the spacer layer for detecting the touch pressure. FIGS. 5f and 5g show that the air gap 420 used as the spacer layer is not positioned within the display module 200. However, FIGS. 5f and 5g may additionally include a case where the air gap 420 is positioned within the display module 200.

FIG. 5g is a cross sectional view of a case where a pressure has been applied to the touch input device shown in FIG. 5f. As with FIG. 5d, when the touch occurs on the touch input device 1000, the display module 200 may be bent or pressed. Here, the "d" between the reference potential layer 270 and the pressure electrode patterns 450 and 460 may be decreased to "d'" by the spacer layer 420 and/or the air gap 220 which are positioned between the reference potential layer 270 and the pressure electrodes 450 and 460. As a result, the magnitude of the touch pressure can be calculated by obtaining the reduction amount of the mutual capacitance from the sensing signal obtained through the receiving electrode.

Figure 5H:
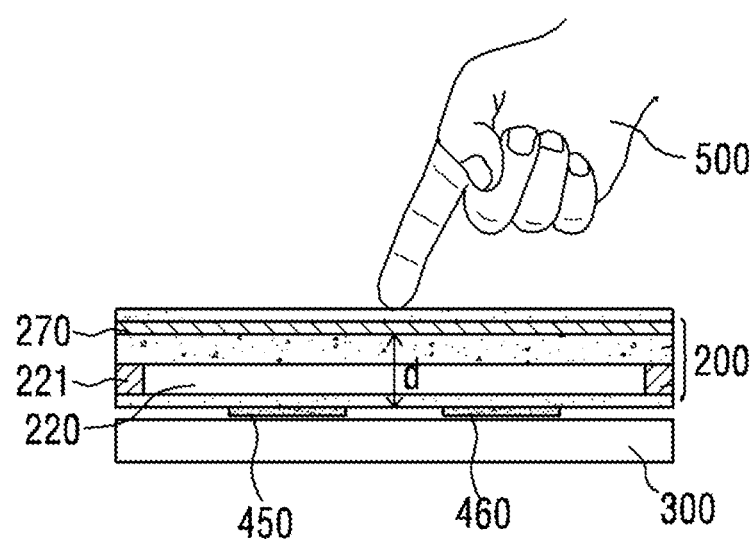

FIG. 5h shows that the pressure electrodes 450 and 460 are formed on the bottom surface of the display module 200. The distance "d" between the reference potential layer 270 and the pressure electrodes 450 and 460 is reduced by touching the touch surface of the touch sensor panel 100. Consequently, this may cause the change of the mutual capacitance between the first electrode 450 and the second electrode 460. FIG. 5h shows that the substrate 300 and the pressure electrodes 450 and 460 are spaced apart from each other so as to describe that the pressure electrodes 450 and 460 are attached on the display module 200. However, this is for description only. The substrate 300 and the pressure electrodes 450 and 460 may not be spaced apart from each other. Also, as with FIGS. 5f and 5g, the display module 200 and the substrate 300 may be spaced apart from each other by the spacer layer 420.

Similarly to the second embodiment, the pressure electrodes 450 and 460 described with reference to FIGS. 5d to 5h according to the third embodiment may also have the pattern shown in FIGS. 7a to 7c, and repetitive descriptions thereof will be omitted.

Figure 5I:
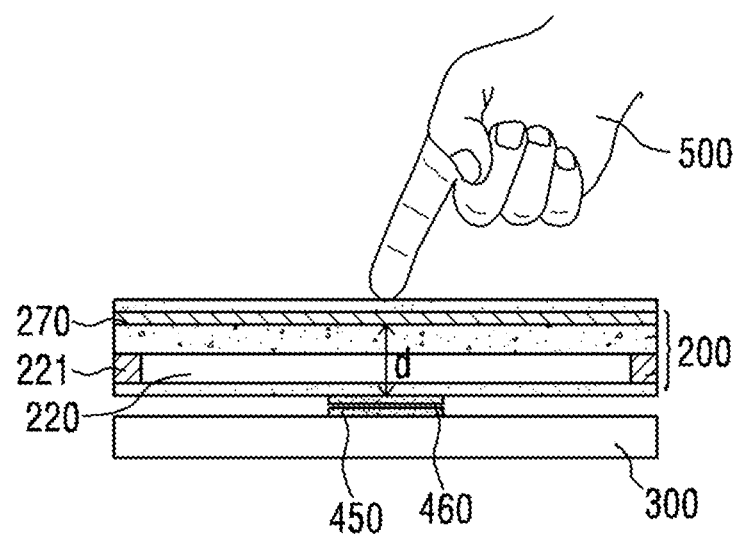

FIG. 5i shows that the pressure electrodes 450 and 460 are formed on the top surface of the substrate 300 and on the bottom surface of the display module 200. FIG. 5i shows that the first electrode 450 is formed on the substrate 300, and the second electrode 460 is formed on the bottom surface of the display module 200. FIG. 5i shows that the first electrode 450 is spaced apart from the second electrode 460. However, this is just intended to describe that the first electrode 450 is formed on the substrate 300 and the second electrode 460 is formed on the display module 200. The first electrode 450 and the second electrode 460 may be spaced apart from each other by the air gap, may have an insulating material placed therebetween, or may be formed to deviate from each other, for example, may be formed in the same layer, not to be overlapped with each other.

Figure 7E:
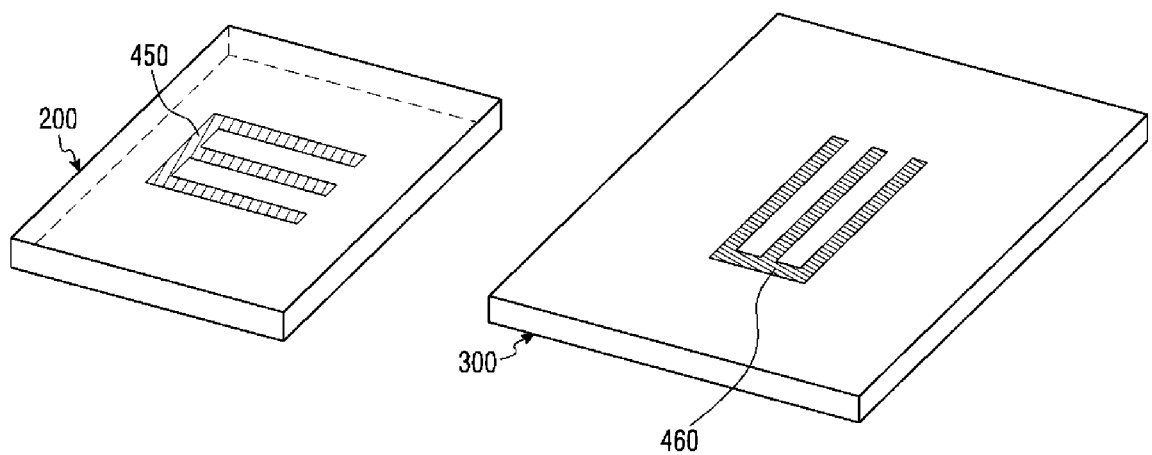

When the pressure is applied to the surface of the touch sensor panel 100 by the object 500, the touch sensor panel 100 and the display module 200 may be bent or pressed. As a result, the distance "d" between the pressure electrodes 450 and 460 and the reference potential layer 270 may be reduced. In this case, the mutual capacitance between the first electrode 450 and the second electrode 460 may be reduced with the reduction of the distance "d". Therefore, the magnitude of the touch pressure can be calculated by obtaining the reduction amount of the mutual capacitance from the sensing signal obtained through the receiving electrode. Here, the first electrode 450 and the second electrode 460 may have the pressure electrode pattern shown in FIG. 7e. FIG. 7e shows that the first electrode 450 is formed on the top surface of the substrate 300 and the second electrode 460 is formed on the bottom surface of the display module 200. As shown in FIG. 7e, the first electrode 450 and the second electrode 460 are disposed perpendicular to each other, so that the capacitance change amount detection sensitivity can be enhanced.

FIGS. 6a to 6i show a touch input device according to a fourth embodiment of the present invention. The fourth embodiment is similar to the second embodiment. Therefore, the following description will focus on the difference between the two embodiments.

Figure 6A:
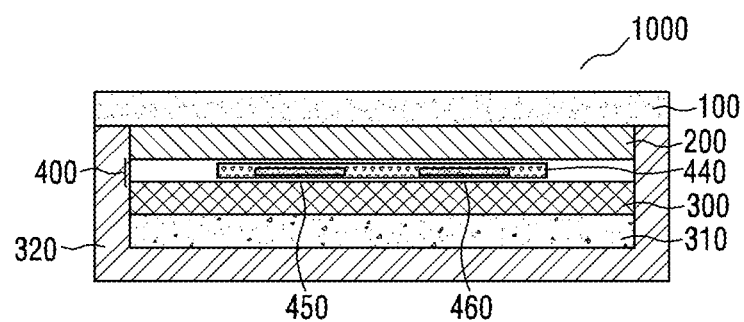
FIGS. 6a to 6i show a touch input device according to a fourth embodiment of the present invention.

FIG. 6a is a cross sectional view of the touch input device according to the fourth embodiment of the present invention. In the fourth embodiment, the electrodes 450 and 460 included in the pressure detection module 400 may be included in the touch input device 1000 in the form of an electrode sheet 440 including the corresponding electrode. Hereafter, this will be described in detail. Here, since the electrodes 450 and 460 should be configured to include the air gap 420 between the substrate 300 and the display module 200, FIG. 6a shows that the electrode sheet 440 including the electrodes 450 and 460 is disposed apart from the substrate 300 and the display module 200. However, the electrodes 450 and 460 may be formed to contact any one of the substrate 300 and the display module 200.

Figure 6B:
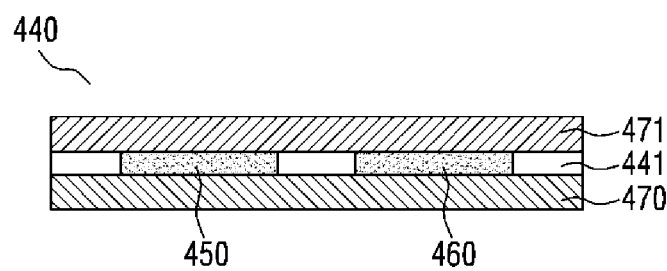

FIG. 6a is an exemplary cross sectional view of the electrode sheet including the pressure electrode to be attached to the touch input device according to the fourth embodiment of the present invention. For instance, the electrode sheet 440 may include an electrode layer 441 between the first insulation layer 470 and the second insulation layer 471. The electrode layer 441 may include the first electrode 450 and/or the second electrode 460. Here, the first insulation layer 470 and the second insulation layer 471 may be made of an insulating material like polyimide. The first electrode 450 and/or the second electrode 460 included in the electrode layer 441 may include a material like copper. In accordance with the manufacturing process of the electrode sheet 440, the electrode layer 441 and the second insulation layer 471 may be adhered to each other by means of an adhesive (not shown) like an optically clear adhesive (OCA). Also, the pressure electrodes 450 and 460 according to the embodiment may be formed by positioning a mask, which has a through-hole corresponding to the pressure electrode pattern, on the first insulation layer 470, and then by spraying a conductive material. FIG. 6b and the following description show that the electrode sheet 440 has a structure in which the pressure electrodes 450 and 460 are included between the insulation layers 470 and 471. However, this is only an example. The electrode sheet 440 may simply include only the pressure electrodes 450 and 460.

In the touch input device 1000 according to the fourth embodiment of the present invention, for the purpose of detecting the touch pressure, the electrode sheet 440 may be attached to the display module 200 such that the electrode sheet 440 and either the substrate 300 or the display module 200 are spaced apart from each other with the spacer layer 420 placed therebetween.

Figure 6C:
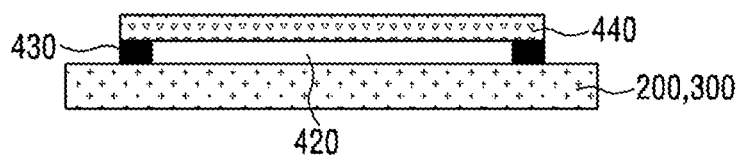

FIG. 6c is a partial cross sectional view of the touch input device including the electrode sheet 440 attached thereto according to a first method. FIG. 6c shows that the electrode sheet 440 has been attached on the substrate 300 or the display module 200.

Figure 6D:
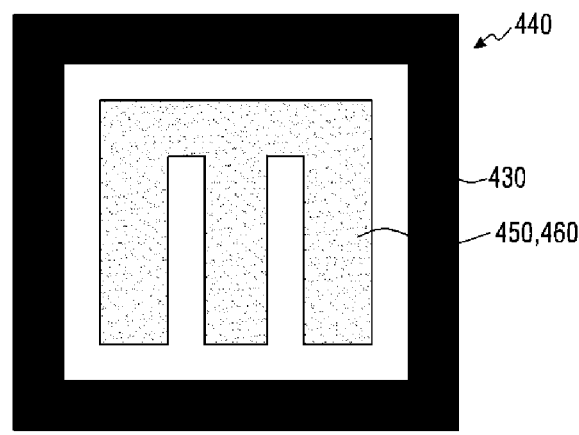

As shown in FIG. 6d, the adhesive tape 430 with a predetermined thickness may be formed along the border of the electrode sheet 440 in order to maintain the spacer layer 420. While FIG. 6d shows the adhesive tape 430 is formed on the entire border (e.g., four sides of the quadrangle) of the electrode sheet 440, the adhesive tape 430 may be formed only on at least some (e.g., three sides of the quadrangle) of the border of the electrode sheet 440. Here, as shown in FIG. 6d, the adhesive tape 430 may not formed in an area including the pressure electrode patterns 450 and 460. As a result, when the electrode sheet 440 is attached to the substrate 300 of the display module 200 by the adhesive tape 430, the pressure electrodes 450 and 460 may be spaced apart from the substrate 300 of the display module 200 by a predetermined distance. According to the embodiment, the adhesive tape 430 may be formed on the top surface of the substrate 300 or on the bottom surface of the display module 200. Also, the adhesive tape 430 may be a double adhesive tape. FIG. 6d shows only one out of the pressure electrodes 450 and 460.

Figure 6E:
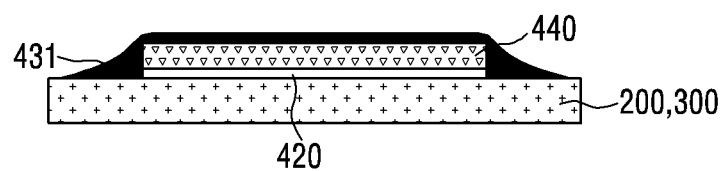

FIG. 6e is a partial cross sectional view of the touch input device including the electrode sheet attached thereto according to a second method. In FIG. 6e, after the electrode sheet 440 is positioned on the substrate 300 or the display module 200, the electrode sheet 440 can be fixed to the substrate 300 or the display module 200 by means of an adhesive tape 431. For this, the adhesive tape 431 may contact at least a portion of the electrode sheet 440 and at least a portion of the substrate 300 or the display module 200. FIG. 6e shows that the adhesive tape 431 continues from the top of the electrode sheet 440 to the exposed surface of the substrate 300 or the display module 200. Here, the surface of the adhesive tape 431, the surface contacting the electrode sheet 440, may have an adhesive strength. Accordingly, in FIG. 6e, the top surface of the adhesive tape 431 may have no adhesive strength.

As shown in FIG. 6e, even though the electrode sheet 440 is fixed to the substrate 300 or the display module 200 by the adhesive tape 431, a predetermined space, i.e., the air gap may be created between the electrode sheet 440 and either the substrate 300 or the display module 200. This is because the electrode sheet 440 is not directly attached to either the substrate 300 or the display module 200 and because the electrode sheet 440 includes the pressure electrodes 450 and 460 having a pattern, so that the surface of the electrode sheet 440 may not be flat. The air gap 420 of FIG. 6e may also function as the spacer layer 420 for detecting the touch pressure.

In the following description, the fourth embodiment has taken an example of a case where the electrode sheet 440 is attached t to the substrate 300 or the display module 200 by the first method shown in FIG. 6c. However, the description can be applied to a case where the electrode sheet 440 is attached and spaced from the substrate 300 or the display module 200 by any method like the second method, etc.

Figure 6F:
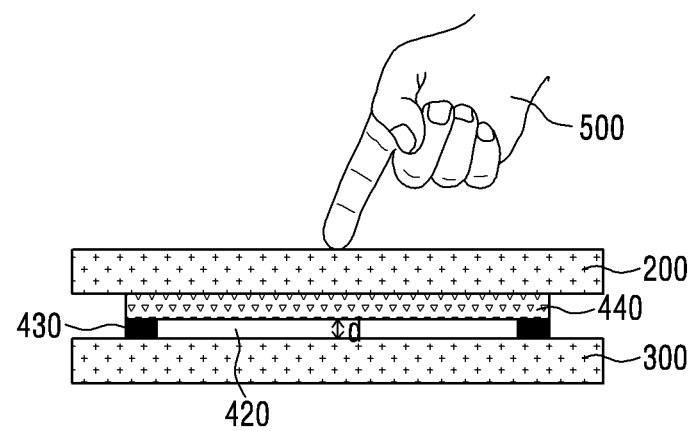

FIG. 6f is a cross sectional view of the touch input device including the pressure electrode pattern according to the fourth embodiment of the present invention. As shown in FIG. 6f, the electrode sheet 440 including the pressure electrodes 450 and 460 may be attached to the substrate 300 such that particularly, the area where the pressure electrodes 450 and 460 have been formed is spaced apart from the substrate 300 by the spacer layer 420. While FIG. 6f shows that the display module 200 contacts the electrode sheet 440, this is just an example. The display module 200 may be positioned apart from the electrode sheet 440.

Figure 6G:
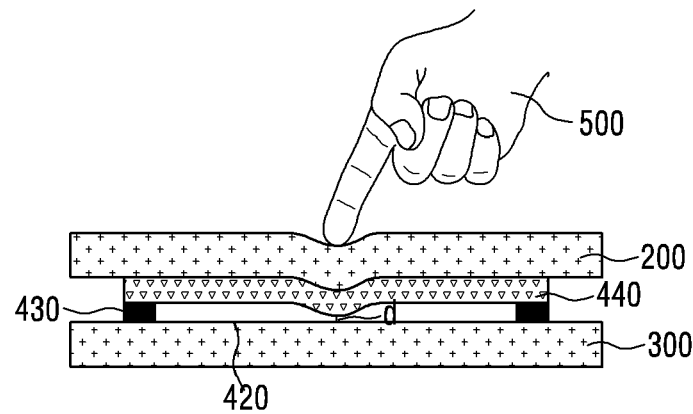

FIG. 6g is a cross sectional view of a case where a pressure has been applied to the touch input device 1000 shown in FIG. 6f. The substrate 300 may have a ground potential so as to block the noise. When the pressure is applied to the surface of the touch sensor panel 100 by the object 500, the touch sensor panel 100 and the display module 200 may be bent or pressed. As a result, the electrode sheet 440 is pressed, so that the distance "d" between the substrate 300 and the pressure electrodes 450 and 460 included in the electrode sheet 440 may be decreased to "d'". In this case, due to the decrease of the distance "d", the fringing capacitance is absorbed in the substrate 300, so that the mutual capacitance between the first electrode 450 and the second electrode 460 may be reduced. Therefore, the magnitude of the touch pressure can be calculated by obtaining the reduction amount of the mutual capacitance from the sensing signal obtained through the receiving electrode.

As shown in FIGS. 6f and 6g, the touch input device 1000 according to the fourth embodiment of the present invention is able to detect the touch pressure by the distance change between the electrode sheet 440 and the substrate 300 to which the electrode sheet 440 has been attached. Here, since the distance "d" between the electrode sheet 440 and the substrate 300 is very small, the touch input device 1000 is able to precisely detect the touch pressure even by the minute change in the distance "d" due to the touch pressure.

Figure 6H:
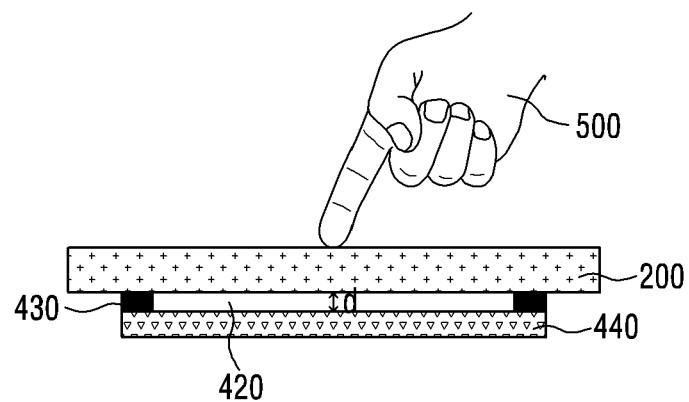
Figure 6I:
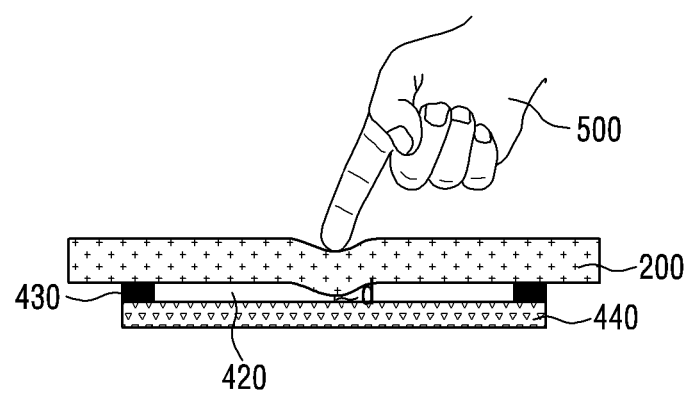

FIG. 6h shows that the pressure electrodes 450 and 460 are attached to the bottom surface of the display module 200. FIG. 6i is a cross sectional view of a case where a pressure has been applied to the touch input device shown in FIG. 6h. Here, the display module 200 may have the ground potential. Therefore, the distance "d" between the display module 200 and the pressure electrodes 450 and 460 is reduced by touching the touch surface of the touch sensor panel 100. Consequently, this may cause the change of the mutual capacitance between the first electrode 450 and the second electrode 460.

As shown in FIGS. 6h and 6i, it can be understood that the touch input device 1000 according to the fourth embodiment of the present invention can also detect the touch pressure by the distance change between the electrode sheet 440 and the display module 200 to which the electrode sheet 440 has been attached.

For example, the distance between the display module 200 and the electrode sheet 440 may be less than the distance between the electrode sheet 440 and the substrate 300. Also, for example, the distance between the electrode sheet 440 and the bottom surface of the display module 200 having the ground potential may be less than the distance between the electrode sheet 440 and the Vcom potential layer and/or any ground potential layer. For example, in the display panel 200 shown in FIGS. 2a to 2c, an electrode (not shown) for blocking the noise may be included between the first polarizer layer 271 and the first glass layer 261. The electrode for blocking the noise may be composed of ITO and may function as the ground.

The first electrode 450 and the second electrode 460 which are included in FIGS. 6f to 6i may have the pattern shown in FIGS. 7a to 7c, and repetitive descriptions thereof will be omitted.

In FIGS. 6a to 6i, it is shown that the first electrode 450 and the second electrode 460 are formed in the same layer. However, it can be considered that the first electrode 450 and the second electrode 460 are formed in different layers in accordance with the embodiment. As shown in FIG. 9b, in the electrode sheet 440, the first electrode 450 may be formed on the first insulation layer 470, and the second electrode 460 may be formed on the second insulation layer 471 positioned on the first electrode 450. The second electrode 460 may be covered with the third insulation layer 472.

Also, according to the embodiment, the pressure electrodes 450 and 460 may be configured to include only any one of the first electrode 450 and the second electrode 460. In this case, it is possible to detect the magnitude of the touch pressure by detecting the change of the capacitance between the one pressure electrode and the ground layer (either the display module 200 or the substrate 300). Here, the pressure electrode may have, as shown in FIG. 7d, a plate shape (e.g., quadrangular plate). Here, as shown in FIG. 9c, in the electrode sheet 440, the first electrode 450 may be formed on the first insulation layer 470 and may be covered with the third insulation layer 472.

Figure 8A:
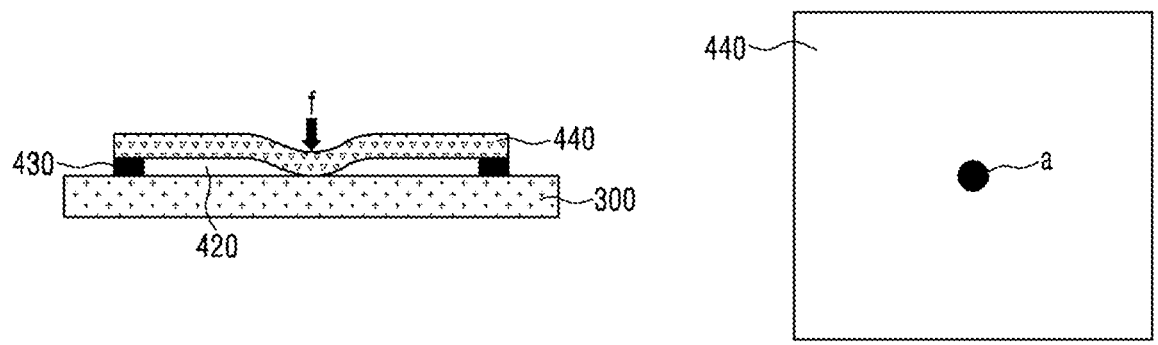
FIGS. 8a and 8b show a relation between the magnitude of the touch pressure and a saturated area in the touch input device according to the embodiment of the present invention.
Figure 8B:
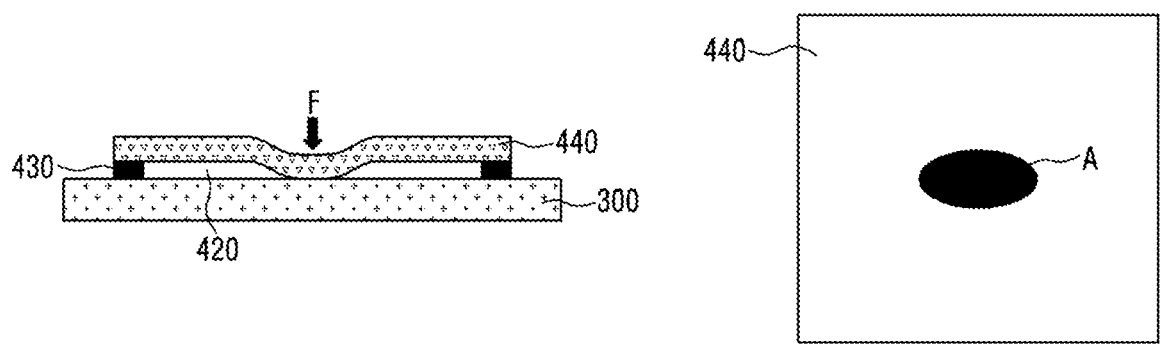

FIGS. 8a and 8b show a relation between the magnitude of the touch pressure and a saturated area in the touch input device according to the embodiment of the present invention. Although FIGS. 8a and 8b show that the electrode sheet 440 is attached to the substrate 300, the following description can be applied in the same manner to a case where the electrode sheet 440 is attached to the display module 200.

The touch pressure with a sufficient magnitude makes a state where the distance between the electrode sheet 440 and the substrate 300 cannot be reduced any more at a predetermined position. Hereafter, the state is designated as a saturation state. For instance, as shown in FIG. 8a, when the touch input device 1000 is pressed by a force "f", the electrode sheet 440 contacts the substrate 300, and thus, the distance between the electrode sheet 440 and the substrate 300 cannot be reduced any more. Here, as shown on the right of FIG. 8a, the contact area between the electrode sheet 440 and the substrate 300 may be indicated by "a".

However, in this case, when the magnitude of the touch pressure becomes larger, the contact area between the electrode sheet 440 and the substrate 300 in the saturation state where the distance between the electrode sheet 440 and the substrate 300 cannot be reduced any more may become greater. For example, as shown in FIG. 8b, when the touch input device 1000 is pressed by a force "F" greater than the force "f", the contact area between the electrode sheet 440 and the substrate 300 may become greater. As shown on the right of FIG. 8a, the contact area between the electrode sheet 440 and the substrate 300 may be indicated by "A". As such, the greater the contact area, the more the mutual capacitance between the first electrode 450 and the second electrode 460 may be reduced. Hereafter, it will be described that the magnitude of the touch pressure is calculated by the change of the capacitance according to the distance change. This may include that the magnitude of the touch pressure is calculated by the change of the saturation area in the saturation state.

FIGS. 8a and 8b are described with reference to the fourth embodiment. It is apparent that the description with reference to FIGS. 8a and 8b can be applied in the same manner to the first to third embodiments and the following fifth embodiment. More specifically, the magnitude of the touch pressure can be calculated by the change of the saturation area in the saturation state where the distance between the pressure electrodes 450 and 460 and either the ground layer or the reference potential layer 200, 300, and 270 cannot be reduced any more.

Figure 10B:
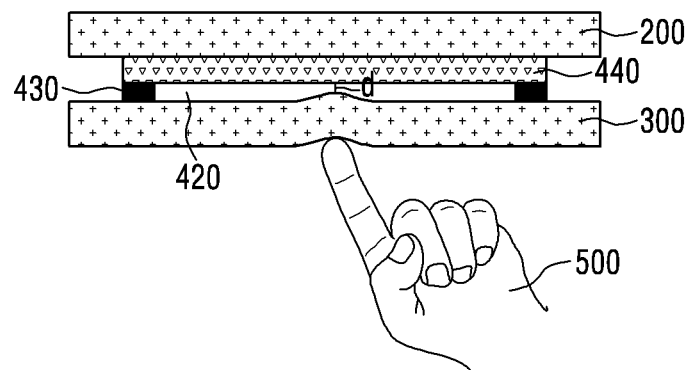

FIGS. 10a and 10b show a touch input device according to a fifth embodiment of the present invention. The touch input device 1000 according to the fifth embodiment of the present invention can sense the touch pressure even when the pressure is applied to the bottom surface as well as the top surface of the touch input device. In this specification, the top surface of the touch input device 1000 as the touch surface may be designated as the top surface of the display module 200 and may include not only the top surface of the display module 200 but also the surface of a member covering the top surface of the display module 200. Also, in this specification, the bottom surface of the touch input device 1000 as the touch surface may be designated as the bottom surface of the substrate 300 and may include not only the bottom surface of the substrate 300 but also the surface of a member covering the bottom surface of the substrate 300.

FIG. 10a shows that the pressure electrodes 450 and 460 are positioned on the bottom surface of the display module 200 in the second embodiment. FIG. 10a shows that the distance between the substrate 300 and the pressure electrodes 450 and 460 is changed when the substrate 300 is pressed or bent by applying a pressure to the bottom surface of the substrate 300. Here, as the distance between the pressure electrodes 450 and 460 and the substrate 300, i.e., the reference potential layer is changed, the capacitance between the first electrode 450 and the second electrode 460 or the capacitance between the substrate 300 and either the first electrode 450 or the second electrode 460 is changed. Accordingly, the touch pressure can be detected.

FIG. 10b shows that the electrode sheet 440 is attached to the substrate 300 in the third embodiment. FIG. 10b shows that the distance between the substrate 300 and the electrode sheet 440 is changed when the substrate 300 is pressed or bent by applying a pressure to the bottom surface of the substrate 300. As with the case of FIG. 10a, as the distance between the pressure electrodes 450 and 460 and the substrate 300, i.e., the reference potential layer is changed, the capacitance between the first electrode 450 and the second electrode 460 or the capacitance between the substrate 300 and either the first electrode 450 or the second electrode 460 is changed. Accordingly, the touch pressure can be detected.

In FIGS. 10*a* and 10*b*, while the fifth embodiment has been described based on the structures of some examples of the second and third embodiments, the fifth embodiment can be applied to a case where the substrate 300 is bent or pressed by applying a pressure to the bottom surface of the substrate 300 included in the structures of the first to fourth embodiments, so that the capacitance between the first electrode 450 and the second electrode 460 is changed or the capacitance between the first electrode 450 and the reference potential layer 200, 300, and 270 is changed. For example, in the structure shown in FIG. 4*c*, when the substrate 300 is bent or pressed, the distance between the display module 200 and the pressure electrodes 450 and 460 may be changed, thereby detecting the touch pressure.

As described above, the touch input device 1000 according to the embodiment of the present invention senses the capacitance change occurring in the pressure electrodes 450 and 460. Therefore, it is necessary for the driving signal to be applied to the drive electrode out of the first and second electrodes 450 and 460, and it is required to detect the touch pressure by the capacitance change amount by obtaining the sensing signal from the receiving electrode. According to the embodiment, it is possible to additionally include a touch sensing IC for the operation of the pressure detection. In this case, the touch input device repeatedly has a configuration similar to the configuration of FIG. 1 including the drive unit 120, sensing unit 110, and controller 130, so that the area and volume of the touch input device 1000 increase.

According to the embodiment, in the touch detection device 1000, the driving signal for the operation of the touch sensor panel 100 is applied and the sensing signal is received through the touch detection device, so that the touch pressure can be detected. Hereafter, the following description will be provided by assuming that the first electrode 450 is the drive electrode and the second electrode 460 is the receiving electrode.

For this, in the touch input device 1000 according to the embodiment of the present invention, the driving signal may be applied to the first electrode 450 from the drive unit 120, and the second electrode 460 may transmit the sensing signal to the sensing unit 110. The controller 130 may perform the scanning of the touch sensor panel 100, and simultaneously perform the scanning of the touch pressure detection, or the controller 130 performs the time-sharing, and then may generate a control signal such that the scanning of the touch sensor panel 100 is performed in a first time interval and the scanning of the pressure detection is performed in a second time interval different from the first time interval.

Therefore, in the embodiment of the present invention, the first electrode 450 and the second electrode 460 should be electrically connected to the drive unit 120 and/or the sensing unit 110. Here, it is common that the touch detection device for the touch sensor panel 100 corresponds to the touch sensing IC 150 and is formed on one end of the touch sensor panel 100 or on the same plane with the touch sensor panel 100. The pressure electrode patterns 450 and 460 may be electrically connected to the touch detection device of the touch sensor panel 100 by any method. For example, the pressure electrode patterns 450 and 460 may be connected to the touch detection device through a connector by using the second PCB 210 included in the display module 200. For example, as shown in FIGS. 4*b* and 5*c*, the conductive traces 460 which electrically extend from the first electrode 450 and the second electrode 460 respectively may be electrically connected to the touch sensing IC 150 through the second PCB 210, etc.

Figure 11A:
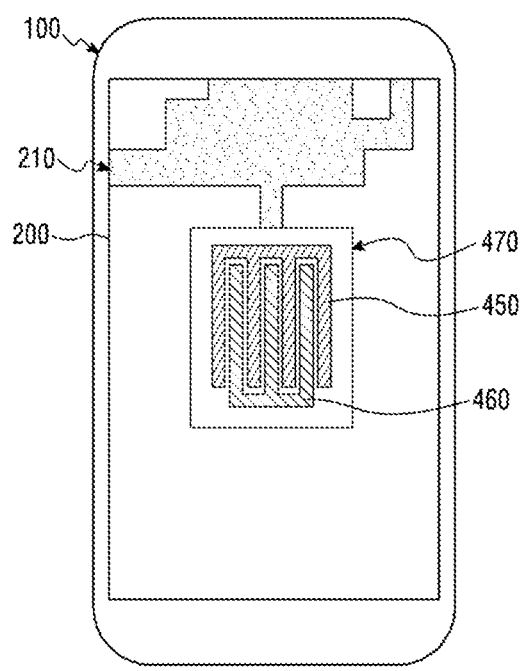
FIGS. 11a to 11b show an attachment method of the pressure electrode according the embodiment of the present invention.
Figure 11B:
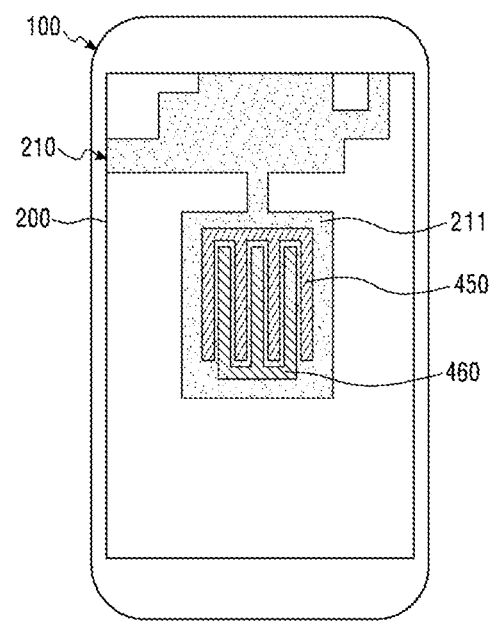

FIGS. 11*a* to 11*b* show that the pressure electrodes 450 and 460 (or electrode sheet 440) are attached to the bottom surface of the display module 200. FIGS. 11*a* and 11*b* show the second PCB 210 on which a circuit for the operation of the display panel has been mounted is disposed on a portion of the bottom surface of the display module 200.

FIG. 11*a* shows that the pressure electrodes 450 and 460 are attached to the bottom surface of the display module 200 such that the first electrode 450 and the second electrode 460 are connected to one end of the second PCB 210 of the display module 200. Here, FIG. 11*a* shows that the first electrode 450 and the second electrode 460 are manufactured on the insulation layer 470. The first electrode 450 and the second electrode 460 is formed on the insulation layer 470 and may be attached as an integral sheet on the bottom surface of the display module 200. A conductive pattern may be printed on the second PCB 210 in such a manner as to electrically connect the pressure electrodes 450 and 460 to a necessary component like the touch sensing IC 150, etc. The detailed description of this will be provided with reference to FIGS. 12*a* to 12*c*. An attachment method of the pressure electrodes 450 and 460 can be applied in the same manner to the substrate 300.

FIG. 11*b* shows that the pressure electrodes 450 and 460 are integrally formed on the second PCB 210 of the display module 200. For example, when the second PCB 210 of the display module 200 is manufactured, a certain area 211 is spared from the second PCB, and then not only the circuit for the operation of the display panel but also the pattern corresponding to the first electrode 450 and the second electrode 460 can be printed on the area 211. A conductive pattern may be printed on the second PCB 210 in such a manner as to electrically connect the first electrode 450 and the second electrode 460 to a necessary component like the touch sensing IC 150, etc.

Figure 12A:
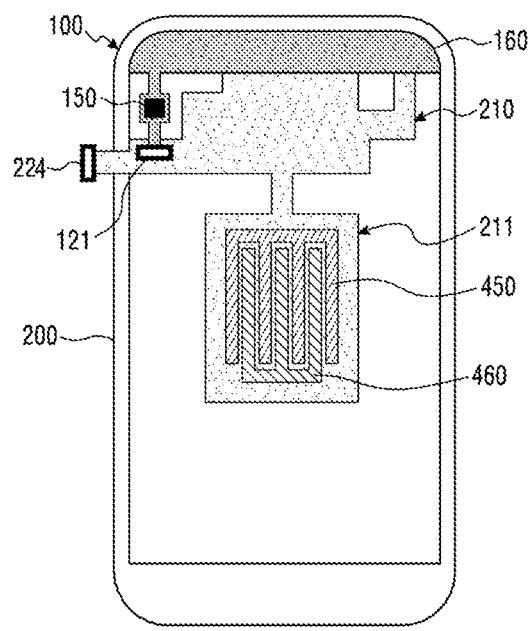
FIGS. 12a to 12c show how the pressure electrode is connected to a touch sensing circuit in accordance with the embodiment of the present invention.
Figure 12B:
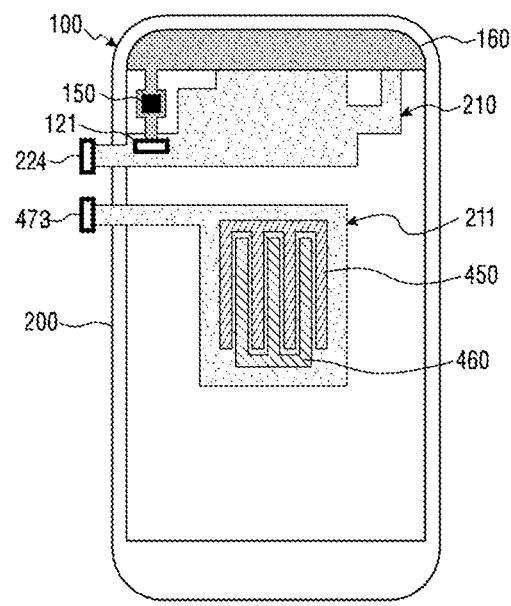
Figure 12C:
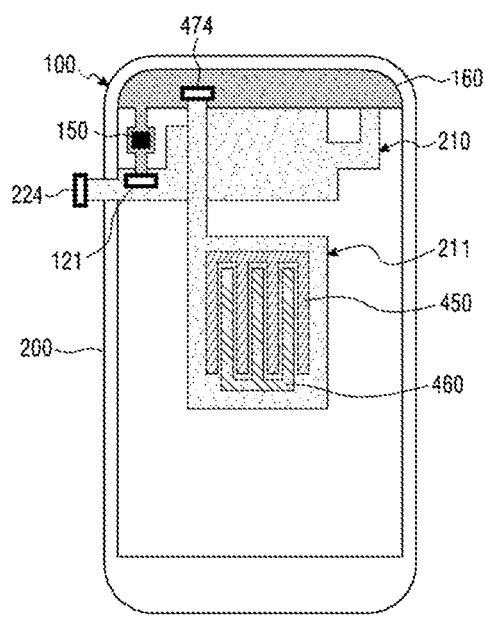

FIGS. 12*a* to 12*c* show a method for connecting the pressure electrodes 450 and 460 (or electrode sheet 440) to the touch sensing IC 150. In FIGS. 12*a* to 12*c*, the touch sensor panel 100 is included outside the display module 200. FIGS. 12*a* to 12*c* show that the touch detection device of the touch sensor panel 100 is integrated in the touch sensing IC 150 mounted on the first PCB 160 for the touch sensor panel 100.

FIG. 12*a* shows that the pressure electrodes 450 and 460 attached to the display module 200 are connected to the touch sensing IC 150 through a first connector 121. As shown in FIG. 10*a*, in a mobile communication device such as a smart phone, the touch sensing IC 150 is connected to the second PCB 210 for the display module 200 through the first connector 121. The second PCB 210 may be electrically connected to the main board through a second connector 224. Therefore, through the first connector 121 and the second connector 224, the touch sensing IC 150 may transmit and receive a signal to and from the CPU or AP for the operation of the touch input device 1000.

Here, while FIG. 12*a* shows that the first electrode 450 is attached to the display module 200 by the method shown in FIG. 11*b*, the first electrode 450 can be attached to the display module 200 by the method shown in FIG. 11*a*. A conductive pattern may be printed on the second PCB 210 in such a manner as to electrically connect the first electrode 450 and the second electrode 460 to the touch sensing IC 150 through the first connector 121.

FIG. 12b shows that the pressure electrodes 450 and 460 attached to the display module 200 are connected to the touch sensing IC 150 through a third connector 473. In FIG. 12b, the pressure electrodes 450 and 460 may be connected to the main board for the operation of the touch input device 1000 through the third connector 473, and in the future, may be connected to the touch sensing IC 150 through the second connector 224 and the first connector 121. Here, the pressure electrodes 450 and 460 may be printed on the additional PCB 211 separated from the second PCB 210. Otherwise, according to the embodiment, the pressure electrodes 450 and 460 may be formed on the insulation layer 470 and may be connected to the main board through the connector 473 by extending the conductive trace, etc., from the pressure electrodes 450 and 460.

FIG. 12c shows that the pressure electrodes 450 and 460 are directly connected to the touch sensing IC 150 through a fourth connector 474. In FIG. 12c, the pressure electrodes 450 and 460 may be connected to the first PCB 160 through the fourth connector 474. A conductive pattern may be printed on the first PCB 160 in such a manner as to electrically connect the fourth connector 474 to the touch sensing IC 150. As a result, the pressure electrodes 450 and 460 may be connected to the touch sensing IC 150 through the fourth connector 474. Here, the pressure electrodes 450 and 460 may be printed on the additional PCB 211 separated from the second PCB 210. The fourth connector 474 may be insulated from the additional PCB 211 so as not to be short-circuited with each other. Also, according to the embodiment, the pressure electrodes 450 and 460 may be formed on the insulation layer 470 and may be connected to the first PCB 160 through the connector 474 by extending the conductive trace, etc., from the pressure electrodes 450 and 460.

The connection method of FIGS. 12b and 12c can be applied to the case where the pressure electrode 450 and 460 are formed on the substrate 300 as well as on the bottom surface of the display module 200.

FIGS. 12a to 12c have been described by assuming that a chip on board (COB) structure in which the touch sensing IC 150 is formed on the first PCB 160. However, this is just an example. The present invention can be applied to the chip on board (COB) structure in which the touch sensing IC 150 is mounted on the main board within the mounting space 310 of the touch input device 1000. It will be apparent to those skilled in the art from the descriptions of FIGS. 12a to 12c that the connection of the pressure electrodes 450 and 460 through the connector can be also applied to another embodiment.

The foregoing has described the pressure electrodes 450 and 460, that is to say, has described that the first electrode 450 constitutes one channel as the drive electrode and the second electrode 460 constitutes one channel as the receiving electrode. However, this is just an example. According to the embodiment, the drive electrode and the receiving electrode constitute a plurality of channels respectively, so that a plurality of pressure detection can be made based on the multi-touch.

Figure 13A:
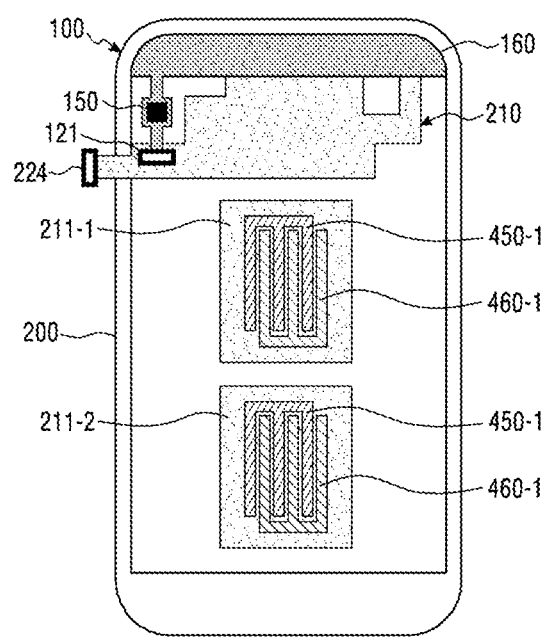
FIGS. 13a to 13c show that the pressure electrode constitutes a plurality of channels in accordance with the embodiment of the present invention.
Figure 13B:
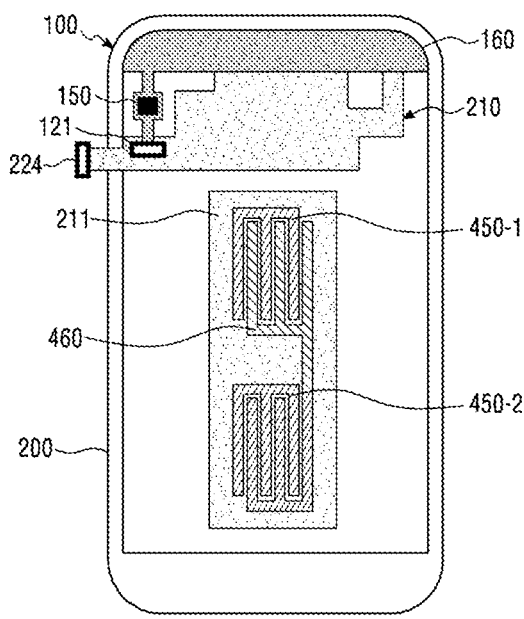
Figure 13C:
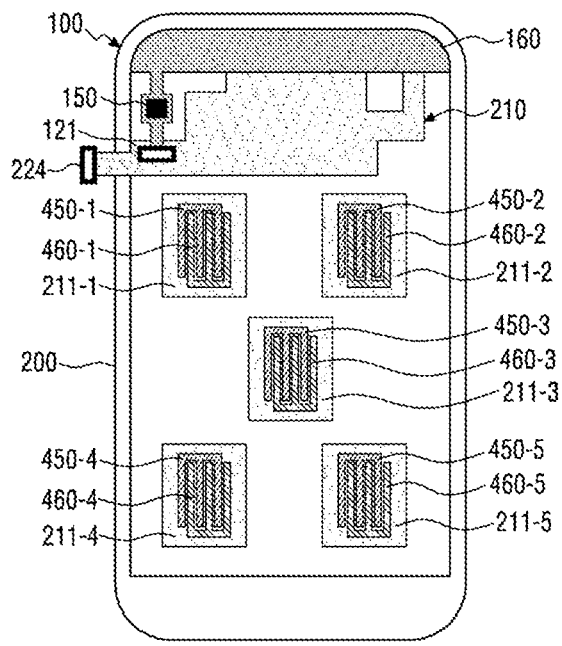

FIGS. 13a to 13c show that the pressure electrode of the present invention constitutes the plurality of channels. FIG. 13a shows the first electrode 450-1 and 450-2 and the second electrode 460-1 and 460-2 constitute two channels respectively. FIG. 13b shows that the first electrode 450 constitutes two channels 450-1 and 450-2 and the second electrode 460 constitutes one channel. FIG. 13c shows the first electrode 450-1 to 450-5 and the second electrode 460-1 to 460-5 constitute five channels respectively.

FIGS. 13a to 13c show that the pressure electrode constitutes a single or a plurality of channels. The pressure electrode may be comprised of a single or a plurality of channels by a variety of methods. While FIGS. 13a to 13c do not show that the pressure electrodes 450 and 460 are electrically connected to the touch sensing IC 150, the pressure electrodes 450 and 460 can be connected to the touch sensing IC 150 by the method shown in FIGS. 12a to 12c and other methods.

Figure 14:
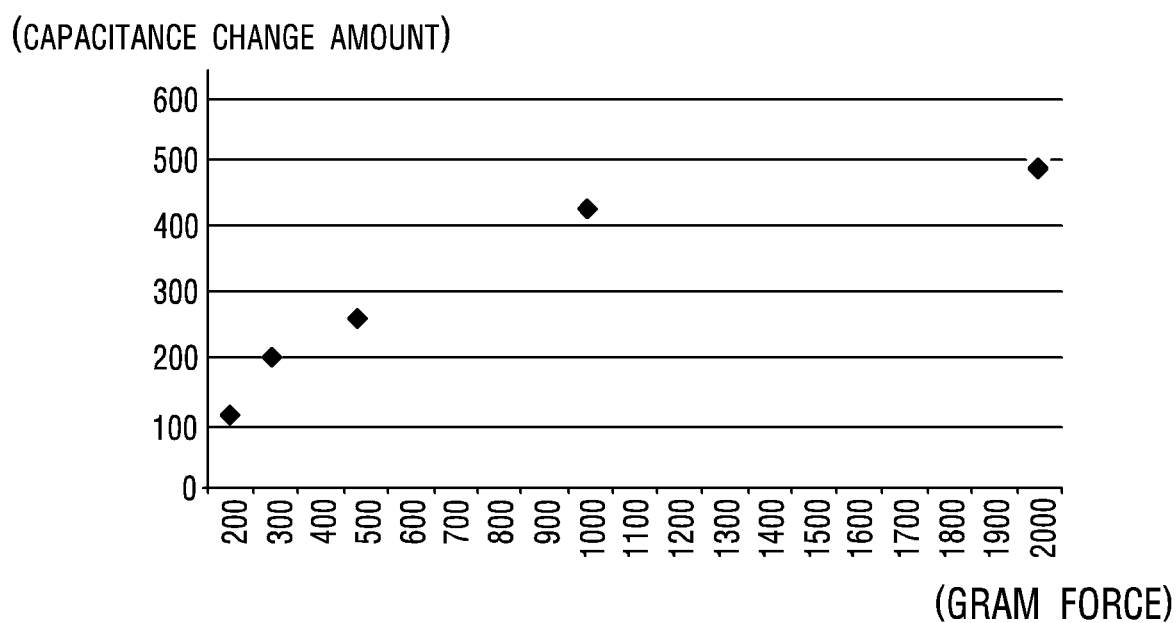
FIG. 14 is a graph that, when an experiment where the central portion of the touch surface of the touch input device according to the embodiment of the present invention is pressed by the non-conductive object is performed, represents a capacitance change amount according to a gram force of the object.

FIG. 14 is a graph that, when an experiment where the central portion of the touch surface of the touch input device 1000 according to the embodiment of the present invention is pressed by the non-conductive object is performed, represents a capacitance change amount according to a gram force of the object. As shown in FIG. 14, the greater the force which is applied to the central portion of the touch surface of the touch input device 1000 according to the embodiment of the present invention, the greater the capacitance change amount of the pressure electrode patterns 450 and 460 for detecting the pressure.

The foregoing has described the capacitance type detection module for detecting the pressure. However, so long as the spacer layer 420 and 220 and the pressure electrodes 450 and 460 (or electrode sheet 440) are used to detect the pressure, the touch input device 1000 according to the embodiment of the present is able to use any type pressure detection module.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:
1. A touch input device comprising:
an organic light emitting display module;
a pressure sensor comprising a pressure electrode outputting a first sensing signal for detecting a touch pressure and which is attached under the organic light emitting display module;
a touch sensor comprising a plurality of drive electrodes to which a driving signal is applied and a plurality of receiving electrodes outputting a second sensing signal for detecting a touch position;
a substrate located under the organic light emitting display module, spaced apart from the organic light emitting display module and comprising a reference potential layer; and
a controller which detects a magnitude of the touch pressure based on the first sensing signal,
wherein the organic light emitting display module is bent by the touch pressure,
wherein a distance between the pressure electrode and the reference potential layer is change according to a bending of the organic light emitting display module, and
wherein the first sensing signal comprises an electrical characteristics information changed according to the distance.

2. The touch input device of claim 1, wherein the pressure sensor further comprises an insulation layer located between the organic light emitting display module and the pressure electrode.

3. The touch input device of claim 1, wherein the pressure electrode contacts and is attached to a bottom of the organic light emitting display module.

4. The touch input device of claim 1, wherein the pressure electrode comprises a plurality of electrodes constituting a plurality of channels.

5. The touch input device of claim 1, wherein the reference potential layer is voltage common electrode.

6. A touch input device comprising:
an organic light emitting display module comprising a reference potential layer;
a substrate located under the organic light emitting display module, spaced apart from the organic light emitting display module;
a pressure sensor comprising a pressure electrode outputting a first sensing signal for detecting a touch pressure and which is attached on the substrate;
a touch sensor comprising a plurality of drive electrodes to which a driving signal is applied and a plurality of receiving electrodes outputting a second sensing signal for detecting a touch position; and
a controller which detects a magnitude of the touch pressure based on the first sensing signal,
wherein the organic light emitting display module is bent by the touch pressure,
wherein a distance between the pressure electrode and the reference potential layer is change according to a bending of the organic light emitting display module, and
wherein the first sensing signal comprises an electrical characteristics information changed according to the distance.

7. The touch input device of claim 6, wherein the pressure sensor further comprises an insulation layer located between the substrate and the pressure electrode.

8. The touch input device of claim 6, wherein the pressure electrode contacts and is attached to a top of the substrate.

9. The touch input device of claim 6, wherein the pressure electrode comprises a plurality of electrodes constituting a plurality of channels.

10. The touch input device of claim 6, wherein the reference potential layer is voltage common electrode.

11. A touch input device comprising:
an organic light emitting display module;
a substrate located under the organic light emitting display module, spaced apart from the organic light emitting display module;
a pressure sensor comprising a first pressure electrode which is attached under organic light emitting display module and a second pressure electrode which is attached on the substrate, wherein one of the first pressure electrode and the second pressure electrode being outputting a first sensing signal for detecting a touch pressure;
a touch sensor comprising a plurality of drive electrodes to which a driving signal is applied and a plurality of receiving electrodes outputting a second sensing signal for detecting a touch position; and
a controller which detects a magnitude of the touch pressure based on the first sensing signal,
wherein the organic light emitting display module is bent by the touch pressure,
wherein a distance between the first pressure electrode and the second pressure electrode is change according to a bending of the organic light emitting display module, and
wherein the first sensing signal comprises an electrical characteristics information changed according to the distance.

12. The touch input device of claim 11, wherein the pressure sensor further comprises an insulation layer located between the first pressure electrode and the organic light emitting display module.

13. The touch input device of claim 11, wherein the pressure sensor further comprises an insulation layer located between the second pressure electrode and the substrate.

14. The touch input device of claim 11, wherein the first pressure electrode contacts and is attached to a bottom of the organic light emitting display module.

15. The touch input device of claim 11, wherein the second pressure electrode contacts and is attached to a top of the substrate.

16. The touch input device of claim 11, wherein each of the first and second pressure electrodes comprises a plurality of electrodes constituting a plurality of channels.

17. The touch input device of claim 11, wherein one of the first and second pressure electrodes is voltage common electrode.

18. A touch input device comprising:
a display panel;
a touch sensor including a driving electrode and a receiving electrode disposed on the display panel or inside the display panel;
an electrode pattern directly formed at a bottom surface of the display panel; and
a controller providing a first driving signal to the driving electrode of the touch sensor, receiving a touch detection signal from the receiving electrode of the touch sensor, detecting a touch position based on the touch detection signal, and providing a second driving signal different from the first driving signal to the electrode pattern,
wherein the electrode pattern is disposed between a central portion and an edge portion of the bottom surface of the display panel, and disposed to surround the central portion.

19. The method of claim 18, wherein the electrode pattern comprises:
a first electrode pattern extending in a first direction and having one end to which the second driving signal is applied;
a second electrode pattern having one end connected to the other end of the first electrode pattern and extending in a second direction perpendicular to the first direction;
a third electrode pattern having one end connected to the other end of the second electrode pattern and extending in the first direction; and
a fourth electrode pattern having one end connected to the other end of the third electrode pattern and extending in the second direction.

20. The method of claim 18, wherein the electrode pattern has a predetermined curvature and is arranged in a circle.

21. The method of claim 18, wherein the electrode pattern comprises:
a plurality of first electrode patterns extending in parallel along the first direction; and a second electrode pattern extending in a second direction perpendicular to the first direction and connected to one end of each of the plurality of first electrode patterns,
wherein the second driving signal is applied to the other end of one of the first electrode pattern among the plurality of first electrode patterns.

22. The method of claim 18,
wherein at least a portion of the touch sensor and the electrode pattern overlap.

* * * * *